(12) United States Patent
Bechstein et al.

(10) Patent No.: US 11,460,933 B2
(45) Date of Patent: Oct. 4, 2022

(54) SHIELD ELECTRODE FOR INPUT DEVICE

(71) Applicant: Apple Inc., Cupertino, CA (US)

(72) Inventors: Daniel Jacob Benjamin Bechstein, Mountain View, CA (US); John Stephen Smith, San Jose, CA (US); Siddharth Shekar, San Jose, CA (US); Teera Songatikamas, San Jose, CA (US); Elvis Mwenda Kibiti, Meru (KE); Jared A. Brauner, Claremont, CA (US); Lindsay Diane Rego Corbet, Campbell, CA (US); Wang Chung Alston Cheung, Sunnyvale, CA (US); Vipin Ayanoor-Vitikkate, Pleasanton, CA (US); Nitin Sitaraman, San Jose, CA (US); Joyan Gratian Sanctis, San Jose, CA (US); Blake R. Marshall, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,549

(22) Filed: Sep. 24, 2020

(65) Prior Publication Data

US 2022/0091685 A1    Mar. 24, 2022

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/044* (2013.01); *G06F 2203/04107* (2013.01)

(58) Field of Classification Search
CPC .... G06F 3/03545; G06F 3/0383; G06F 3/044; G06F 2203/04107
See application file for complete search history.

(56) References Cited

U.S. PATENT DOCUMENTS

| 5,414,227 A | 5/1995 | Schubert et al. |
| 7,567,414 B2 | 7/2009 | Bertin et al. |

(Continued)

FOREIGN PATENT DOCUMENTS

| EP | 2466431 A1 | 6/2012 |
| EP | 2624104 A2 | 8/2013 |

(Continued)

OTHER PUBLICATIONS

Advisory Action received for U.S. Appl. No. 14/848,289, dated Sep. 25, 2018, 3 pages.

(Continued)

*Primary Examiner* — Peter D McLoone
(74) *Attorney, Agent, or Firm* — Kubota & Basol LLP

(57) ABSTRACT

In some examples, a stylus can include a conductive shield. In some examples, the conductive shield can include a plurality of traces along an edge of a printed circuit board (PCB) including the stylus circuitry. In some examples, the conductive shield can include a shield can coupled to the PCB and disposed around the components of the stylus circuitry. In some examples, the conductive shield can include a hollow portion into which the stylus circuitry can be disposed and a solid portion that can act as a reference electrode. In some examples, the conductive shield can include a hollow sleeve disposed around the stylus circuitry. In some examples, the conductive sleeve can be attached to the PCB. In some examples, the conductive sleeve can be disposed between layers of a housing of the stylus. In some examples, the conductive sleeve can be integrated with the stylus housing.

17 Claims, 16 Drawing Sheets

(56) References Cited

U.S. PATENT DOCUMENTS

| | | |
|---|---|---|
| 8,199,132 B1 | 6/2012 | Oda et al. |
| 8,493,359 B2 | 7/2013 | Wright et al. |
| 8,657,814 B2 | 2/2014 | Werneth et al. |
| 8,773,405 B1 | 7/2014 | Ryshtun et al. |
| 8,816,985 B1 | 8/2014 | Tate et al. |
| 8,854,147 B2 | 10/2014 | Lin |
| 9,018,547 B2 | 4/2015 | Rimon et al. |
| 9,117,677 B2 | 8/2015 | Ma et al. |
| 9,189,088 B2 | 11/2015 | Tsao et al. |
| 9,310,943 B1 | 4/2016 | Omelchuk et al. |
| 9,383,835 B2 | 7/2016 | Lo et al. |
| 9,594,440 B2 | 3/2017 | Park et al. |
| 9,606,680 B1 | 3/2017 | Sundara-rajan |
| 9,612,671 B1 | 4/2017 | Blaszczak et al. |
| 10,558,293 B2 | 2/2020 | Wigdor et al. |
| 11,079,862 B2 | 8/2021 | Brunet et al. |
| 2007/0195068 A1 | 8/2007 | Kable et al. |
| 2008/0156546 A1 | 7/2008 | Hauck |
| 2009/0008162 A1 | 1/2009 | Yang et al. |
| 2009/0273579 A1 | 11/2009 | Zachut et al. |
| 2009/0289922 A1 | 11/2009 | Henry |
| 2010/0117661 A1 | 5/2010 | Bruwer et al. |
| 2010/0315384 A1 | 12/2010 | Hargreaves et al. |
| 2011/0297458 A1 | 12/2011 | Mao et al. |
| 2012/0146960 A1 | 6/2012 | Shih et al. |
| 2012/0154340 A1 | 6/2012 | Vuppu et al. |
| 2012/0268428 A1* | 10/2012 | Nakata ............... G06F 3/03545 345/179 |
| 2012/0327042 A1 | 12/2012 | Harley et al. |
| 2012/0331546 A1 | 12/2012 | Falkenburg et al. |
| 2013/0088465 A1 | 4/2013 | Geller et al. |
| 2013/0106718 A1 | 5/2013 | Sundara-rajan |
| 2013/0141397 A1 | 6/2013 | Dunagan |
| 2013/0194225 A1 | 8/2013 | Shen et al. |
| 2013/0285900 A1 | 10/2013 | Liu |
| 2014/0146009 A1 | 5/2014 | Huang |
| 2015/0091856 A1 | 4/2015 | Park et al. |
| 2015/0123923 A1 | 5/2015 | Stern |
| 2015/0123932 A1 | 5/2015 | Collins |
| 2015/0138164 A1 | 5/2015 | Hinson |
| 2015/0160744 A1 | 6/2015 | Mohindra et al. |
| 2015/0193024 A1 | 7/2015 | Kai et al. |
| 2015/0277618 A1 | 10/2015 | Bulea |
| 2015/0309598 A1 | 10/2015 | Zeliff et al. |
| 2015/0355732 A1 | 12/2015 | Mann |
| 2016/0048224 A1 | 2/2016 | Brunet et al. |
| 2016/0162045 A1 | 6/2016 | Wincent |
| 2016/0179271 A1 | 6/2016 | Vandermeijden |
| 2016/0266663 A1 | 9/2016 | Holsen |
| 2016/0313825 A1 | 10/2016 | Hotelling et al. |
| 2016/0320913 A1 | 11/2016 | Gao et al. |
| 2017/0010697 A1* | 1/2017 | Jiang ................. G06F 3/033 |
| 2017/0068344 A1 | 3/2017 | Bhandari et al. |
| 2017/0075441 A1 | 3/2017 | Leigh et al. |
| 2017/0075446 A1 | 3/2017 | Vandermeijden |
| 2017/0212635 A1 | 7/2017 | Cordeiro et al. |
| 2017/0262100 A1 | 9/2017 | Leigh et al. |
| 2017/0285772 A1 | 10/2017 | Yamamoto |
| 2017/0308189 A1 | 10/2017 | Peretz et al. |
| 2017/0344174 A1 | 11/2017 | Pant et al. |
| 2018/0181245 A1 | 6/2018 | Beck et al. |
| 2018/0338065 A1 | 11/2018 | Zyskind et al. |
| 2019/0155408 A1 | 5/2019 | Hou et al. |
| 2019/0155411 A1 | 5/2019 | Kinrot et al. |
| 2019/0324564 A1 | 10/2019 | Brunet et al. |
| 2019/0371787 A1 | 12/2019 | Mandal |
| 2020/0019257 A1* | 1/2020 | Chang ................. G06F 3/0383 |
| 2020/0192521 A1 | 6/2020 | Case et al. |
| 2020/0201505 A1 | 6/2020 | Jung et al. |
| 2021/0026464 A1 | 1/2021 | Yamada et al. |
| 2021/0232240 A1 | 7/2021 | Smith |
| 2021/0240325 A1 | 8/2021 | Smith |
| 2021/0286493 A1 | 9/2021 | Wang et al. |
| 2021/0303152 A1 | 9/2021 | Hosur et al. |
| 2022/0095443 A1 | 3/2022 | Bechstein et al. |
| 2022/0100310 A1 | 3/2022 | Shahsavari et al. |
| 2022/0100341 A1 | 3/2022 | Seyed Mousavi et al. |

FOREIGN PATENT DOCUMENTS

| | | |
|---|---|---|
| EP | 2672494 A1 | 12/2013 |
| EP | 2813918 A1 | 12/2014 |
| EP | 2624104 A3 | 3/2016 |
| EP | 3326050 A1 | 5/2018 |
| WO | 2017/044428 A1 | 3/2017 |
| WO | 2020/023640 A1 | 1/2020 |
| WO | 2020/027818 A1 | 2/2020 |

OTHER PUBLICATIONS

Final Office Action received for U.S. Appl. No. 14/848,289, dated Jun. 21, 2018, 11 pages.

International Search Report received for PCT Patent Application No. PCT/US2016/048590, dated Feb. 7, 2017, 6 pages.

International Search Report received for PCT Patent Application No. PCT/US2016/048630, dated Nov. 18, 2016, 3 pages.

Notice of Allowance received for U.S. Appl. No. 17/161,499, dated Dec. 1, 2021, 8 pages.

Non Final Office Action received for U.S. Appl. No. 14/848,277, dated Nov. 18, 2016, 18 Pages.

Non Final Office Action received for U.S. Appl. No. 14/848,277, dated Sep. 19, 2017, 11 Pages.

Non-Final Office Action received for U.S. Appl. No. 14/848,289, dated Nov. 3, 2017, 18 pages.

Non-Final Office Action received for U.S. Appl. No. 14/848,289, dated Nov. 17, 2016, 11 pages.

Non-Final Office Action received for U.S. Appl. No. 16/836,789, dated Oct. 1, 2021, 27 pages.

Non-Final Office Action received for U.S. Appl. No. 17/031,570, dated Dec. 17, 2021, 11 pages.

Notice of Allowance received for U.S. Appl. No. 14/848,277, dated May 8, 2018, 5 Pages.

Notice of Allowance received for U.S. Appl. No. 14/848,289, dated Nov. 21, 2018, 6 pages.

Notice of Allowance received for U.S. Appl. No. 17/161,499, dated Aug. 12, 2021, 9 pages.

Notice of Allowance received for U.S. Appl. No. 16/836,789, dated Feb. 18, 2022, 9 pages.

* cited by examiner

SHIELD ELECTRODE FOR INPUT DEVICE

FIELD

This relates to an input device and, more particularly, to a stylus including a shield electrode.

BACKGROUND

Many types of input devices are presently available for performing operations in a computing system, such as buttons or keys, mice, trackballs, joysticks, touch panels, touch screens and the like. Touch screens, in particular, are popular because of their ease and versatility of operation as well as their declining price. Touch screens can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch panel using a finger, stylus or other object at a location often dictated by a user interface (UI) being displayed by the display device. In general, touch screens can recognize a touch and the position of the touch on the touch panel, and the computing system can then interpret the touch in accordance with the display appearing at the time of the touch, and thereafter can perform one or more actions based on the touch. In some examples, touch panels can be included in other input devices that are separate from any display screen, such as trackpads. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In some examples, the electronic device is able to detect objects proximate to or touching a touch-sensitive surface such as a touch screen. For example, the electronic device can detect conductive objects, such as human fingers, palms, and hands and input devices, such as a stylus. In some examples, a stylus can be an active stylus that includes a power supply and generates a stylus signal that can be detected by the electronic device. The electronic device can detect an active stylus by detecting the stylus signal, which can capacitively couple to one or more touch electrodes of the touch-sensitive surface. In some examples, a stylus can be a passive stylus that does not include a power supply. The passive stylus can include one or more conductive components that can capacitively couple to an electrode of the touch screen to produce or modify a signal sensed by the electronic device. For example, a passive stylus may reduce the capacitive coupling between a drive line and a sense line of the touch-sensitive surface by also being capacitively coupled to the drive and sense lines, thereby modifying the signal sensed by the sense line, thus enabling the electronic device to detect the stylus.

SUMMARY

This disclosure relates to an input device and, more particularly, to a stylus including a shield electrode. In some examples, the stylus can include circuitry that can produce a non-linear response to a periodic drive signal provided by a touch sensitive surface (e.g., a touch screen or trackpad). The stylus can further include a stylus tip electrode coupled to the stylus circuitry and configured to receive the drive signals from the touch sensitive surface and provide the non-linear stylus signal to the touch sensitive surface. In some examples, it is possible for the stylus circuitry to capacitively couple to the touch sensitive surface, which can cause errors in determining the location of the stylus. Thus, in some examples, it can be advantageous to include a conductive shield between the stylus circuitry and the touch sensitive surface to reduce the amount of capacitive coupling between the touch sensitive surface and the stylus circuitry, which can improve the accuracy of detecting the stylus' location.

In some examples, the conductive shield can include a plurality of traces along an edge of a printed circuit board (PCB) including the stylus circuitry. In some examples, the conductive shield can include a shield can coupled to the PCB and disposed around the components of the stylus circuitry. In some examples, the conductive shield can include a hollow portion into which the stylus circuitry can be disposed and a solid portion that can act as a reference electrode. In some examples, the conductive shield can include a hollow sleeve disposed around the stylus circuitry. In some examples, the conductive sleeve can be attached to the PCB. In some examples, the conductive sleeve can be disposed between layers of a housing of the stylus. In some examples, the conductive sleeve can be integrated with the stylus housing (e.g., the stylus housing can include a conductive material that acts as a shield).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This disclosure relates to an input device and, more particularly, to a stylus including a shield electrode. In some examples, the stylus can include circuitry that can produce a non-linear response to a periodic drive signal provided by a touch sensitive surface (e.g., a touch screen or trackpad). The stylus can further include a stylus tip electrode coupled to the stylus circuitry and configured to receive the drive signals from the touch sensitive surface and provide the non-linear stylus signal to the touch sensitive surface. In some examples, it is possible for the stylus circuitry to capacitively couple to the touch sensitive surface, which can cause errors in determining the location of the stylus. Thus, in some examples, it can be advantageous to include a conductive shield between the stylus circuitry and the touch sensitive surface to reduce the amount of capacitive coupling between the touch sensitive surface and the stylus circuitry, which can improve the accuracy of detecting the stylus' location.

In some examples, the conductive shield can include a plurality of traces along an edge of a printed circuit board (PCB) including the stylus circuitry. In some examples, the conductive shield can include a shield can coupled to the PCB and disposed around the components of the stylus circuitry. In some examples, the conductive shield can include a hollow portion into which the stylus circuitry can be disposed and a solid portion that can act as a reference electrode. In some examples, the conductive shield can include a hollow sleeve disposed around the stylus circuitry. In some examples, the conductive sleeve can be attached to the PCB. In some examples, the conductive sleeve can be disposed between layers of a housing of the stylus. In some examples, the conductive sleeve can be integrated with the stylus housing (e.g., the stylus housing can include a conductive material that acts as a shield).

Figure 1A:
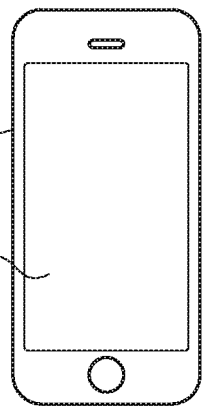
FIGS. 1A-1E illustrate example systems that can detect input devices implementing shielding techniques according to examples of the disclosure.
Figure 1B:
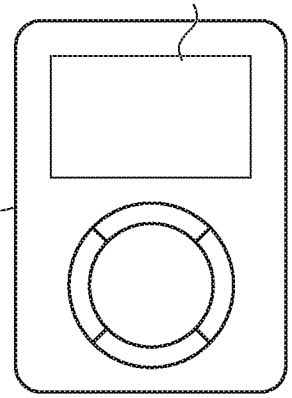
Figure 1C:
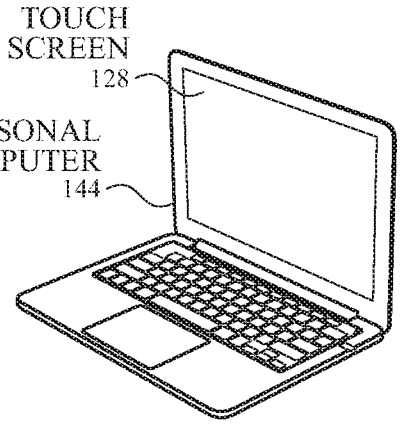
Figure 1D:
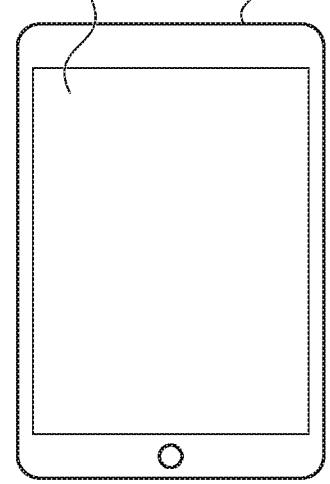
Figure 1E:
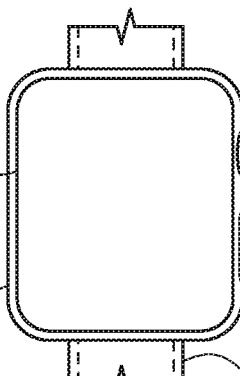

FIGS. 1A-1E illustrate example systems that can detect input devices implementing shielding techniques according to examples of the disclosure. FIG. 1A illustrates an example mobile telephone 136 that includes a touch screen 124 that can detect input devices implementing shielding techniques according to examples of the disclosure. FIG. 1B illustrates an example digital media player 140 that includes a touch screen 126 that can detect input devices implementing shielding techniques according to examples of the disclosure. FIG. 1C illustrates an example personal computer 144 that includes a touch screen 128 that can detect input devices implementing shielding techniques according to examples of the disclosure. FIG. 1D illustrates an example tablet computing device 148 that includes a touch screen 130 that can detect input devices implementing shielding techniques according to examples of the disclosure. FIG. 1E illustrates an example wearable device 150 that includes a touch screen 132 and can be attached to a user using a strap 152 and that can detect input devices implementing shielding techniques according to examples of the disclosure. It is understood that other devices can include a touch screen and detect input devices implementing shielding techniques. Additionally it should be understood that although the disclosure herein primarily focuses on touch screens, the disclosure of detecting input devices implementing shielding techniques can be implemented for devices including touch sensor panels (and displays) that may not be implemented as a touch screen.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other (e.g., as described below with reference to FIG. 4A) on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

In some examples, touch screens 124, 126, 128, 130, and 132 can sense an active stylus. The active stylus can produce a stylus signal that can capacitively couple to the touch electrodes of touch screen 124, 126, 128, 130, and 132 to be sensed by sense circuitry coupled to the touch electrodes. In some examples, a touch screen including touch node electrodes 408 can determine the location of the stylus by determining which touch node electrodes 408 detect the stylus signal. In some examples, a touch screen including row electrodes 404 and column electrodes 406 can determine the location of the stylus along the rows and along the columns to determine the location of the stylus on the touch screen. Touch screens can be configured to detect both passive conductive objects (e.g., fingers, passive styluses) and active styluses. For example, the electronic device can perform a mutual or self capacitance scan to detect the conductive objects (e.g., perform a "touch scan") and perform stylus scans to detect the active stylus.

Figure 2:
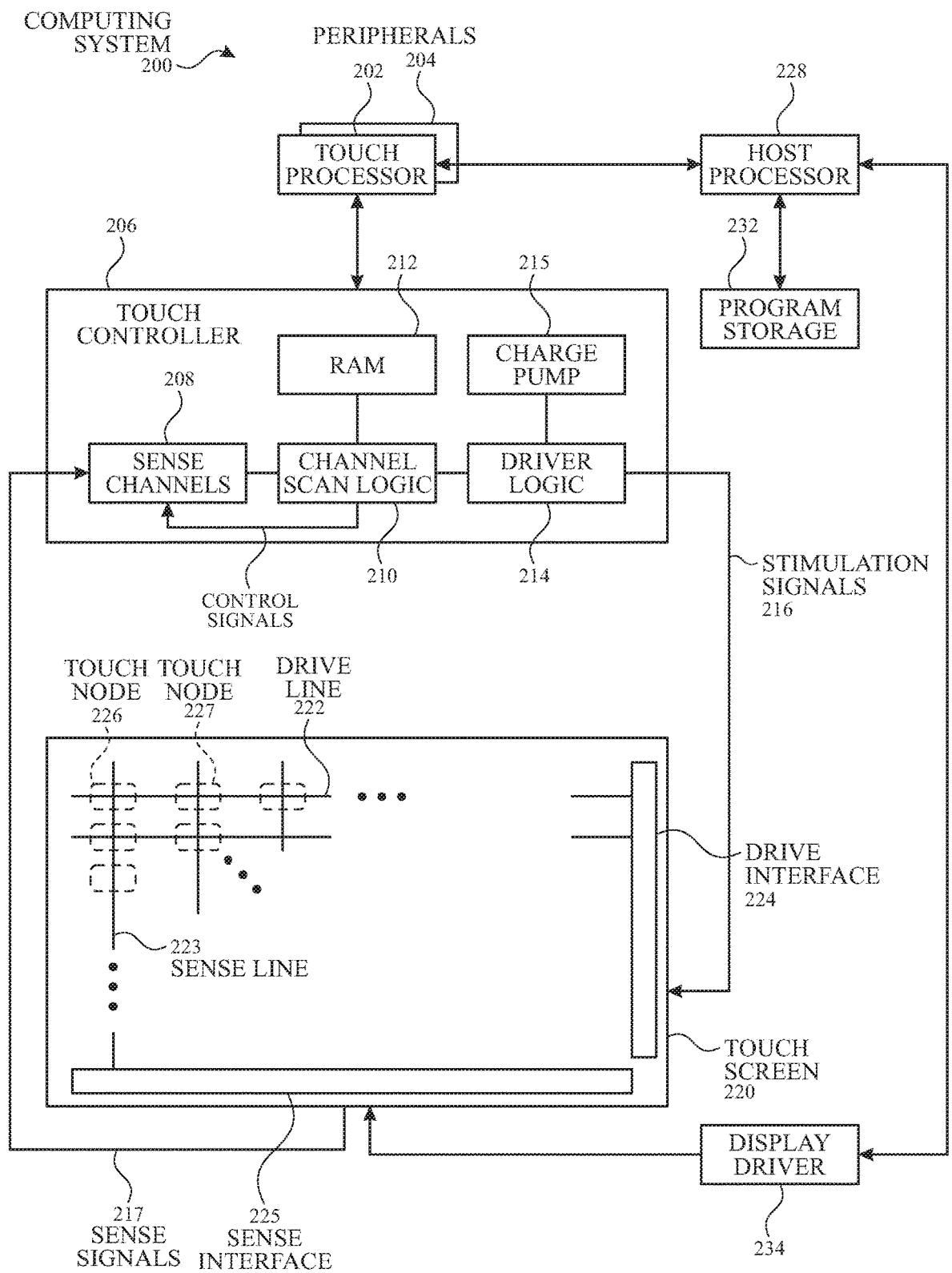
FIG. 2 illustrates an example computing system including a touch screen that can be implemented with multi-frequency stylus scans according to examples of the disclosure.

FIG. 2 illustrates an example computing system including a touch screen that can use multi-frequency stylus scans according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220 (e.g., to drive line 322 or touch node electrode 302 directly or via touch sensing circuit 314), as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including multi-frequency stylus scans, can be performed by firmware stored in memory (e.g., one of the peripherals 204 in FIG. 2) and executed by touch processor 202 and/or touch controller 206, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive touch nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
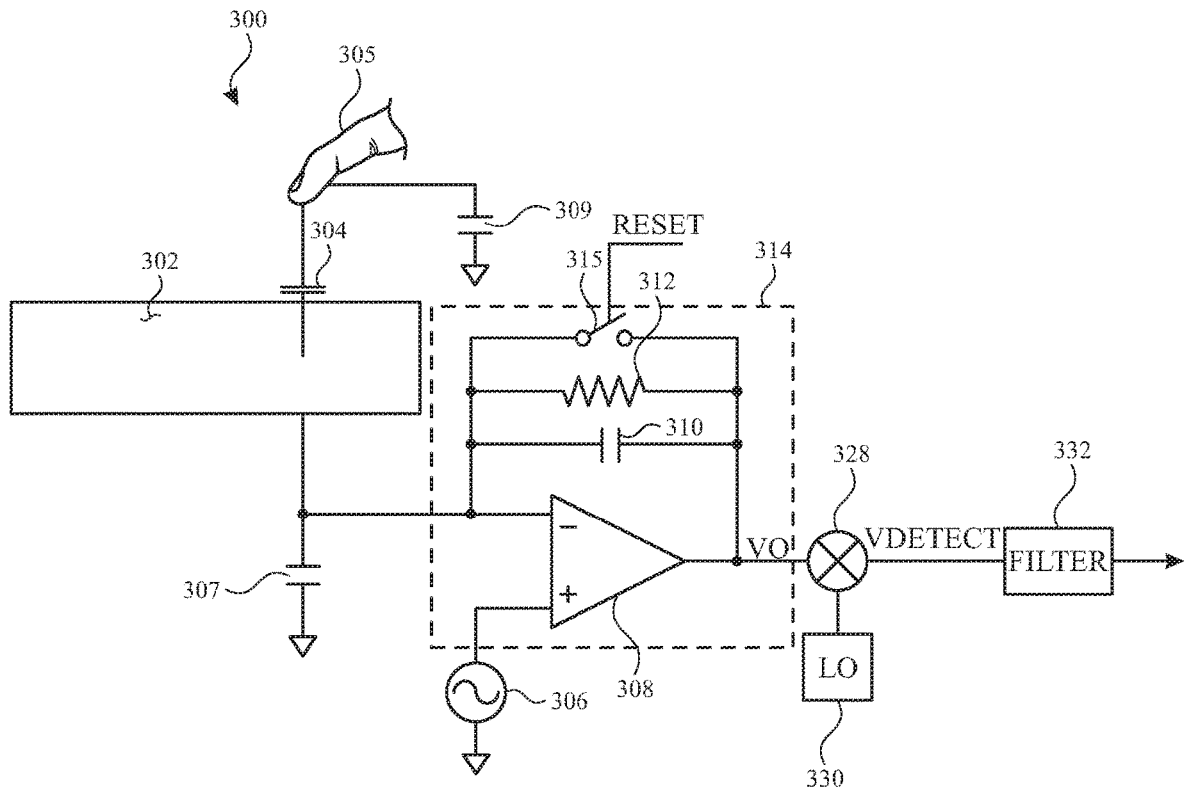
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., implemented in the one or more sense channels 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
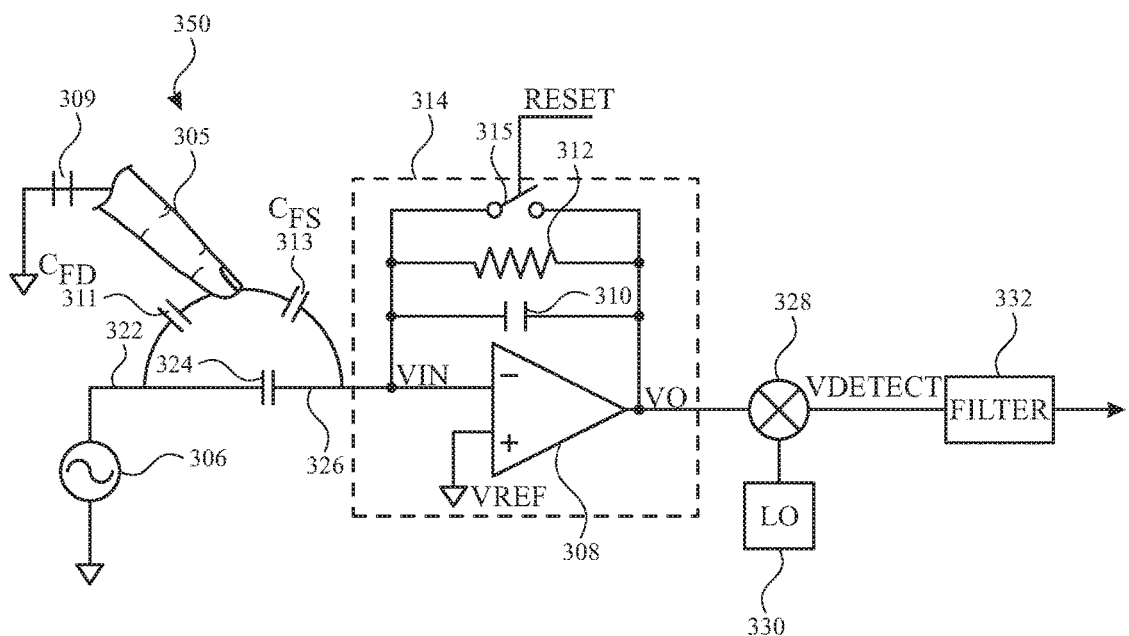
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., implemented in the one or more sense channels 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage Vo to keep yin substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

In some examples, a stylus signal can be detected using touch sensor circuit 350 or similar circuitry. Instead of the drive circuitry providing a stimulation signal (e.g., via AC stimulation source 306) to drive lines 322, the stylus can provide a stylus signal that capacitively couples to sense line 326. The coupled signal can be sensed by sensing circuit 314. In some examples, because the stylus provides the stimulation signal, row electrodes and column electrodes (drive lines and sense lines in the mutual capacitance touch sensing) can be coupled to sensing circuits and can be sensed. For example, the electronic device can perform one or more scans to sense the row electrodes during a first time and can then perform one or more scans to sense the column electrodes during a second time. In some examples, the row electrodes and column electrodes can be sensed simultaneously. In some examples, a touch screen 402 including touch node electrodes 408 can sense an active stylus in a similar manner (e.g., each can be coupled to a sensing circuit 314. Additional examples of active styluses and sensing active styluses are described below with reference to FIGS. 5 and 6.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
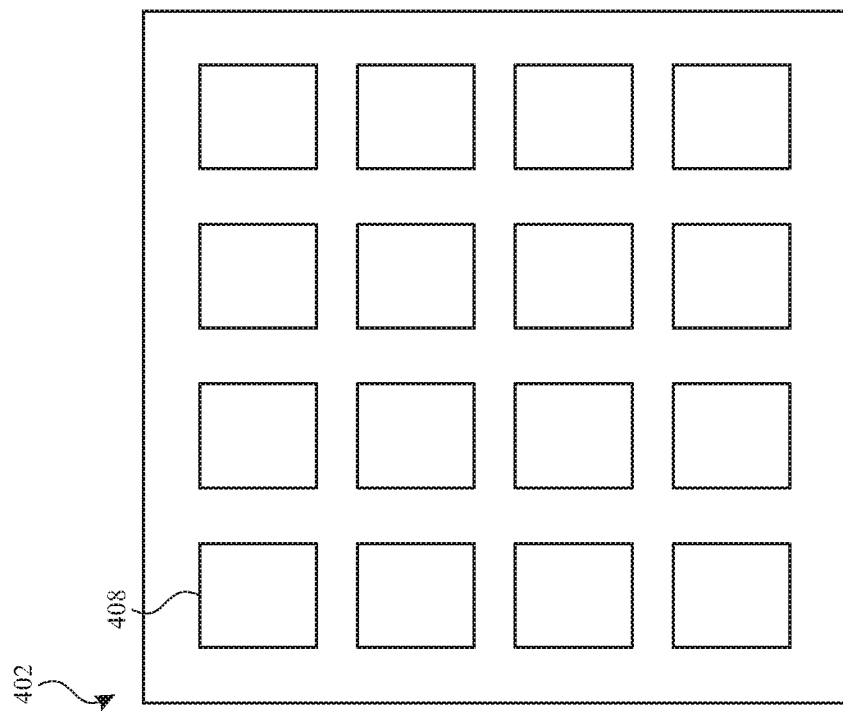
FIG. 4B illustrates touch screen with touch node electrodes arranged in a pixelated touch node electrode configuration according to examples of the disclosure.
Figure 4A:
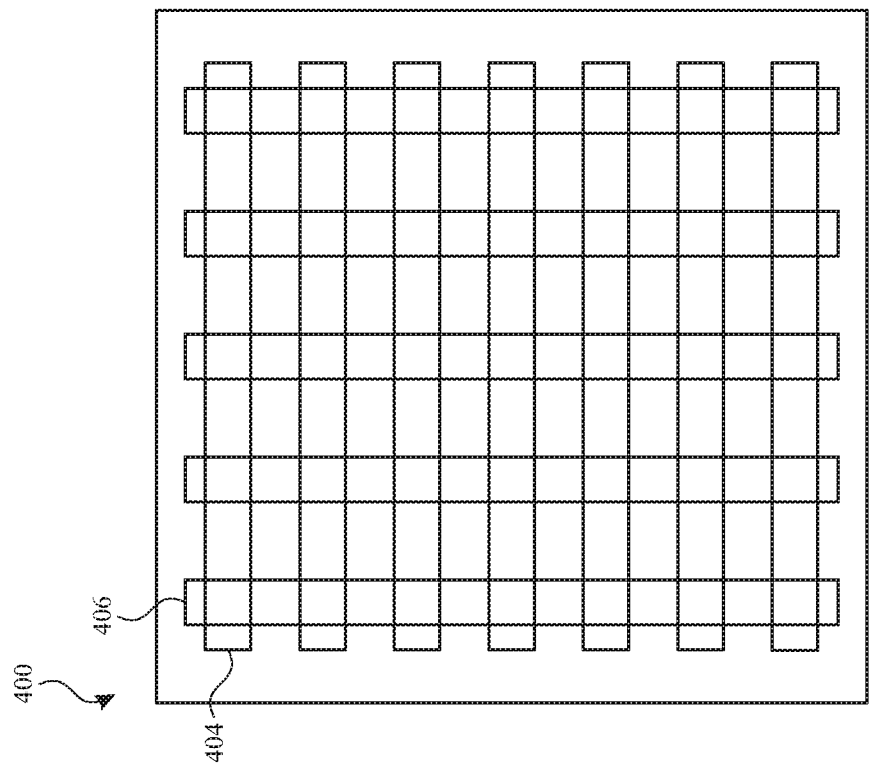
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. In some examples, touch screen 400 can sense a stylus signal provided by an active stylus using touch electrodes 404 and 406.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. In some examples, touch screen 402 can use touch electrodes 408 to sense an active stylus.

Figure 5:
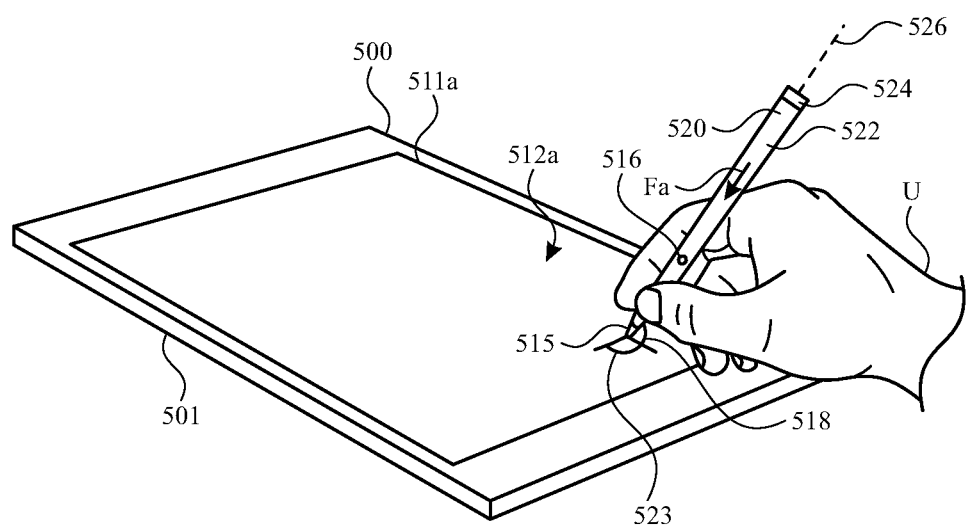
FIG. 5 illustrates an exemplary stylus and exemplary electronic device according to some examples of the disclosure.

FIG. 5 illustrates an exemplary system including a stylus 520 and an electronic device 500 according to some examples of the disclosure. Stylus 520 (e.g., a marking tool, smart pen, smart brush, wand, chisel, user-manipulated electronic input device, hand-held input device, and the like, or any other suitable accessory, such as a glove) may be configured to provide input to electronic device 500 (e.g., a tablet computer, laptop computer, desktop computer, and the like). A system user may manipulate the orientation and position of stylus 520 relative to a surface of the touch-sensitive display of electronic device 500 to convey information to electronic device 500, such as, but not limited to, writing, sketching, scrolling, gaming, selecting user interface elements, moving user interface elements, and so on. In some examples, the surface of the touch-sensitive display of electronic device 500 may be a multi-touch display screen. However, in some examples, the surface of the touch-sensitive display of electronic device 500 may be a non-display surface of the touch-sensitive display, such as, but not limited to, a trackpad or drawing tablet. The surface of the touch-sensitive display may be a foldable or flexible surface or display. Electronic device 500 may be used to capture free-form user input from stylus 520. For example, the user can slide, move, draw, or drag a tip of stylus 520 across the surface of the touch-sensitive display of electronic device 500, which, in response, may render a graphical object (e.g., a line) using a display positioned below the surface of the touch-sensitive display. In such an example, the rendered graphical object may follow or otherwise correspond to the path of stylus 520 across the surface of the touch-sensitive display of electronic device 500. The thickness and/or shape and/or intensity and/or any other suitable rendered characteristic of the rendered graphical object may vary based, at least in part, on one, some, or each of various characteristics, including, but not limited to, a force or speed with which the user moves stylus 520 across the surface of the touch-sensitive display, an angle of stylus 520 relative to the surface of the touch-sensitive display (e.g., the inclination of stylus 520 relative to a plane of the surface of the touch-sensitive display, a writing angle of stylus 520 relative to a horizontal writing line traversing the surface of the touch-sensitive display, etc.), a variable setting of a variable input component of stylus 520, which one of multiple tips of stylus 520 is interacting with the surface of the touch-sensitive display, a variable setting of an application running on electronic device 500 (e.g., a virtual drawing space application), and/or a combination thereof.

Broadly and generally, electronic device 500 may be operative to determine and/or estimate one or more outputs of stylus 520 (and/or changes therein over time as a scalar or vector quantity), to interpret the user's manipulation thereof as input to electronic device 500. For example, electronic device 500 may be operative to estimate: the magnitude of force applied by a user's grip to stylus 520 (e.g., non-binary estimate of magnitude as a scalar or vector quantity); a magnitude (e.g., non-binary estimate of magnitude as a scalar or vector quantity) of force applied (e.g., force applied Fa) by stylus 520 to the surface of the touch-sensitive display of electronic device 500; the location at which the area over which stylus 520 may touch or nearly touch the surface of the touch-sensitive display of electronic device 500; a polar angle of stylus 520 relative to a plane of the surface of the touch-sensitive display (e.g., inclination of stylus 520 (e.g., a polar angle 518 (e.g., as may be defined between a vector normal to the plane of surface of the touch-sensitive display 511a and a longitudinal axis 526 of stylus 520, such as a zenith))); an azimuthal angle of stylus 520 relative to an axis of the surface of the touch-sensitive display (e.g., an azimuthal angle 523 (e.g., as may be defined between the polar angle 518 and a reference vector within the plane of surface of the touch-sensitive display 510a, such as an axis of electronic device 500)); a vector or scalar representation of the angular position of stylus 520 relative to a plane of the surface of the touch-sensitive display; three-dimensional coordinates (e.g., spherical, Cartesian, and so on) of one or more points along the length of stylus 520 relative to the surface of the touch-sensitive display; and so on. In some examples, electronic device 500 may be operative to monitor such variables over time to estimate rates of change therein as either scalar or vector quantities (e.g., velocity, acceleration, and so on). The operation of estimating or determining two-dimensional position coordinates of stylus 520 as a point (or area) within or parallel to a plane of the surface of the touch-sensitive display, whether such operation is performed by electronic device 500, performed by stylus 520, and/or performed, at least in part, as a result of cooperation there between (or with one or more other electronic devices), is generally referred to herein as "locating" the stylus.

Electronic device 500 and/or stylus 520 can be configured to estimate and/or monitor the location of stylus 520 over time and compute differential or integral quantities such as, but not limited to, acceleration, velocity, total force applied, path length, and so on. For example, the operation of estimating the velocity and/or acceleration of stylus 520 relative to the surface of the touch-sensitive display as stylus 520 is moved across that surface, whether such operation is performed by electronic device 500, performed by stylus 520, and/or performed, at least in part, as a result of cooperation therebetween (or with one or more other electronic devices), is generally referred to herein as estimating the "planar motion" of the stylus. The operation of estimating the angular velocity and/or acceleration of stylus 520 relative to a plane of the surface of the touch-sensitive display as it is moved thereacross, whether performed by electronic device 500, performed by stylus 520, and/or performed, at least in part, as a result of cooperation therebetween (or with one or more other electronic devices), is generally referred to herein as estimating the "angular motion" of the stylus. Additionally or alternatively, electronic device 500 and/or stylus 520 can be configured to estimate the distance (e.g., Z-height) of a portion of stylus 520 (e.g., the tip of the stylus) from the surface of the touch-sensitive display of device 500, and such an estimated distance may be used to determine a "make or break" event between the stylus and device, such as for making a determination when a drawn graphical line should start or stop or a stylus lift off event should occur.

Electronic device 500 may be any portable, mobile, or hand-held electronic device configured to interact with stylus 520 for changing any suitable characteristic(s) of device 500 (e.g., any suitable graphical object input tool characteristics that may be utilized to render a graphical object) in response to manipulation of stylus 520 across a surface of the touch-sensitive display of electronic device 500. Alternatively, electronic device 500 may not be portable at all, but may instead be generally stationary. Electronic device 500 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 500 may include one or more components described above with reference to FIG. 2 (e.g., electronic device 500 can be the same as electronic device 200).

Returning to FIG. 5, a user U manipulates the orientation and position of stylus 520 relative to surface of the touch-sensitive display input component 510a (e.g., a particular input component 510) of electronic device 500 in order to convey information to electronic device 500. Electronic device 500 may be configured to perform or coordinate multiple operations such as, but not limited to, locating stylus 520, estimating the angular position of stylus 520, estimating the magnitude of force by stylus 520 to surface of the touch-sensitive display 510a, determining a variable setting of a variable input component of stylus 520, determining a variable setting of an application running on electronic device 500 (e.g., a virtual drawing space application), and/or a combination thereof. The electronic device 500 can perform these and other operations at the same time or at different times. In one non-limiting example, the operation of determining the location of stylus 520 can be performed simultaneously with the operation of determining the angular position of stylus 520, while the operation of estimating the magnitude of force by stylus 520 to surface of the touch-sensitive display 510a may be performed periodically and/or based on whether electronic device 500 is configured to accept force input from stylus 520 given a particular operational mode of electronic device 500 (or of stylus 520) at a particular time.

FIG. 5 illustrates an exemplary stylus 520 and exemplary electronic device 500 according to some examples of the disclosure. A user U can grip a barrel or handle or body portion 522 of stylus 520 extending between a front tip portion 515 of stylus 520 and a rear tip portion 524 of stylus 520. User U may interact with the electronic device 500 by sliding a tip portion, such as tip portion 515, of stylus 520 across surface of the touch-sensitive display 510a of electronic device 500. As shown in FIG. 5, for example, device 500 can be a tablet computing device. It should be understood that many other electronic devices (with or without displays positioned below a stylus surface of the touch-sensitive display), such as any of the electronic device described above with reference to FIGS. 1A-1E, can be used to detect stylus 520. For example, the electronic device can be implemented as a peripheral input device, a trackpad, a drawing tablet, and the like.

In some examples, stylus 520 may have a general form of a writing instrument, such as a pen or a pencil-like structure with a cylindrical body 522 with two ends, such as a first end terminated at front portion 515 and a second end terminated at rear portion 524. One or more of portions 515 and 524 can be removable, affixed to body 522, or an integral part of body 522. In some examples, other input devices with different form factors are possible.

The stylus 520 can include one or more input or output components, which can be located at one or more of portions 515-524 of stylus 520. These components can include a button, a dial, a slide, a force pad, a touch pad, audio component, haptic component, and the like, may at least partially reside. As one example, at least a portion of a simple mechanical switch or button input component that may be manipulated by user U for adjusting a variable setting of stylus 520 can be located at aperture 516. In some examples, stylus 520 can operate in a first mode when such an input component is manipulated in a first way and in a second mode when such an input component is manipulated in a second way.

Rear portion 524 of stylus 520 may provide a cosmetic end to body 522. Rear portion 524 may be formed integrally with body 522. In some examples, rear portion 524 may be formed similarly to front portion 515. For example, rear portion 524 may provide another tip feature for interacting with a surface of the touch-sensitive display of device 500 (e.g., stylus 520 may be flipped over by user U to drag portion 524 across surface of the touch-sensitive display input component 510a of electronic device 500 rather than to drag portion 515 across surface of the touch-sensitive display input component 510a of electronic device 500, which may enable different interactions with device 500). In some examples, rear portion 524 may include a switch or button or any other input component that may be manipulated by user U for adjusting a setting of stylus 520.

Tip portion 515 of stylus 520 may be configured to contact or nearly contact surface of the touch-sensitive display 510a of device 500, allowing the user U to use the stylus 520 to interact with the device 500. In some examples, tip 515 can include a tapered end or point, similar to a pen, which can enable the user U to more precisely control stylus 520 and provide a familiar form factor. In some examples, tip 515 may be blunt or rounded, may take the form of a rotatable or fixed ball, or may have another shape. Tip 515 can include a material that can be softer than a material of the surface of the touch-sensitive display 510a. For example, tip 515 can include a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials. In some examples, tip 515 not cause damage to surface of the touch-sensitive display 510a or layers applied to surface of the touch-sensitive display 510a when the stylus 520 is in use.

In some examples, a stylus may not include a power supply (e.g., battery or wired powered supply), therefore, the stylus 520 may not be operative to generate any stylus electric field independently (e.g., without being stimulated by an external stimulus). Instead, a stylus may be provided with limited stylus I/O circuitry that may be operative to be stimulated by an external stimulus, such as a device stimulus that may be generated by device I/O circuitry of device I/O interface 511a of electronic device 500 and that may be operative to stimulate the stylus I/O circuitry when located proximate to device I/O interface 511a and/or by user U when holding stylus 520, whereby that stimulation of the stylus I/O circuitry may be operative to enable the stylus I/O circuitry to provide any suitable stylus electric field that may then be detected by device 500 for estimating the location of the stylus. Not only may such stylus I/O circuitry be configured to require no internal power supply for providing a unique stylus electric field, but also such stylus I/O circuitry, when stimulated, may be configured to provide a stylus electric field that may be distinguishable by device 500 from an electric field that may be provided by a user's direct contact with device I/O interface 511a.

Figure 6:
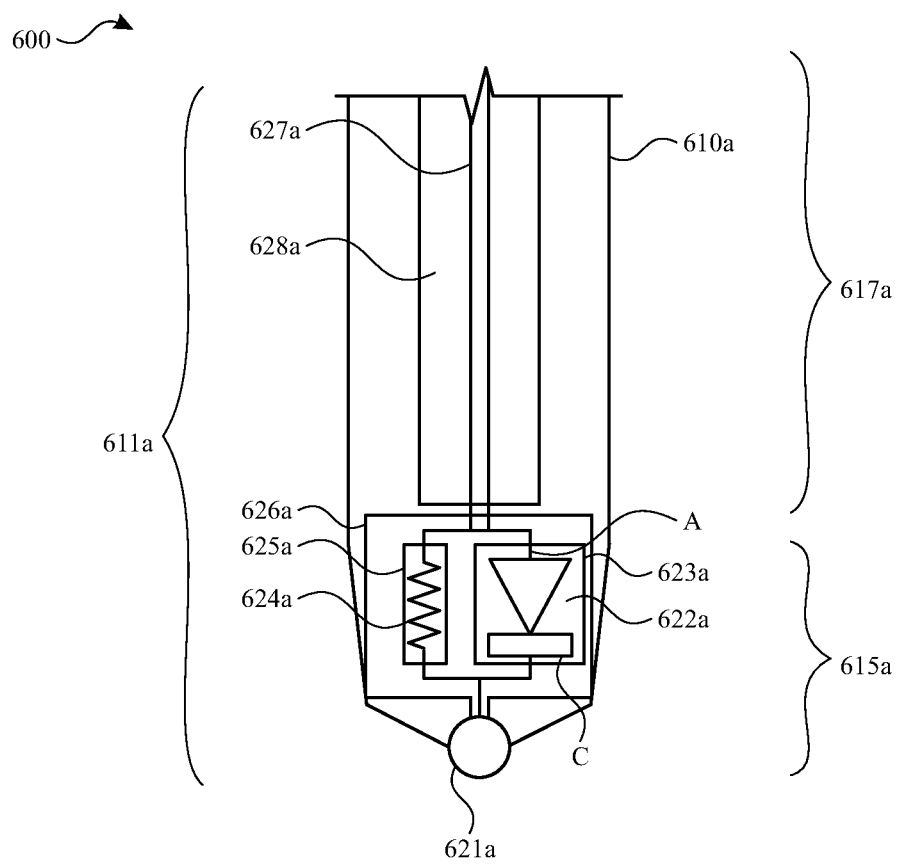
FIG. 6 illustrates an exemplary stylus according to some examples of the disclosure.

For example, FIG. 6 illustrates an exemplary stylus 600 according to some examples of the disclosure. In some examples, stylus 600 may include stylus I/O circuitry 611a. Stylus I/O circuitry 611a may operate in response to external stimulus, such as a drive signal generated by an electronic device (e.g., electronic device 136, 140, 144, 148, 150, 200, or 500). As shown by FIG. 6, for example, stylus 600 may include body portion 617a extending between a front tip portion 615a and a rear tip portion (not shown), where body portion 617a may be configured to be held by user U as the user uses stylus 600 to interact with an electronic device.

In some examples, stylus I/O circuitry 611a can include a front tip interface component 621a that can be included in front tip portion 615a of the stylus 600. In some examples, front tip interface component 621a can include one or more of, silicone, rubber, fluoro-elastomer, plastic, nylon, conductive or dielectric foam, metal (e.g., brass (e.g., a brass ball with a dielectric or polymer coating (e.g., a thin coating with a high dielectric constant))), or any other suitable material or combination of materials. Thus, in some examples, contact and movement of front tip interface component 621a across surface of the touch-sensitive display 510a of electronic device 500 may not damage surface of the touch-sensitive display 510a or layers applied to surface of the touch-sensitive display 510a. In some examples, front tip interface component 621a can be removably attached to body 617a, such as via threadings/screws, detents and/or recesses, interference-fit or snap-fit, and/or magnetic attraction, and/or the like.

Front tip stylus circuitry 626a may be positioned between and electrically coupled to front tip interface component 621a and body stylus circuitry 627a. Front tip stylus circuitry 626a can provide a non-linear load between body stylus circuitry 627a and front tip interface component 621a. In some examples, the front tip interface component 621a of stylus 600 may be stimulated by a signal that can be generated by device I/O circuitry of device I/O interface 511a of electronic device 500. For example, front tip stylus circuitry 626a may include any suitable non-linear electrical circuitry 623a that may be electrically coupled (e.g., in series) between front tip interface component 621a and body stylus circuitry 627a. For example, the non-linear circuitry 623a of stylus 600 can include at least one diode 622a. As shown in FIG. 6, an anode A of diode 622a may be electrically coupled to body stylus circuitry 627a and a cathode C of diode 622a may be electrically coupled to front tip interface component 621a. It should be understood, however, that it is possible to orient the diode 622a in the opposite way (e.g., connecting the anode A to the front tip interface component 621a). In some examples, the stylus 600 can include any suitable number (e.g., one or two or three or four or more) of diodes 622a. The diodes can be coupled together in series (e.g., a cathode of one diode may be coupled to an anode of a next diode and/or the like) or in parallel.

Device I/O circuitry of I/O interface 511a of an electronic device 500 may provide a drive signal that can stimulate front tip interface component 621a of stylus 600 when front tip interface component 621a of stylus 600 is proximate to or touching surface of the touch-sensitive display input component 510a of I/O interface 511a. In some examples, the drive signal can be capacitively coupled to the tip 621a of the stylus 600. A non-linear response of the stylus 600 can be transmitted via tip 621a to one or more sense electrodes of the electronic device 500, enabling the electronic device 500 to detect and locate the stylus 600.

Moreover, in some examples, non-linear electrical circuitry 623a that may be electrically coupled to front tip interface component 621a may enable stylus 600 to be identified and distinguished from nearby user touches, dragging fingers, palm rests, and/or the like, due to a non-linear load that may generate a non-linear distortion or harmonics (e.g., a second harmonic) at touch pixels near the stylus tip. In some examples, diode 622a may be provided with any suitable characteristics that enable the electronic device 500 to detect stylus 600. For example, diode 622a can have a low capacitance (e.g., low parasitic capacitance), low reverse leakage, and/or low turn on voltage diode. The junction capacitance of such a diode may be configured to be low (e.g., less than 1.0 picofarad and/or less than 50 femtofarads). A reverse leakage current of such a diode may be controlled to be not too high. A Schottky diode, two or more Schottky diodes in series, or a specifically designed diode may be used.

In some examples, as shown, circuitry 626a may also include (e.g., in parallel with non-linear electrical circuitry 623a) any suitable resistance circuitry 625a (e.g., at least one resistor 624a). Resistor 624a can control reverse leakage current of non-linear electrical circuitry 623a and/or prevent direct current ("DC") positive voltage build up at the diode by, for example, draining off any DC while maintaining non-linearity of circuitry 626a. The resistance of resistor 624a may be selected in any suitable manner, such as by using a model of the panel, including its stimulation voltage and capacitance to the tip, and the non-linear device model, and optimizing the model. As an example, when using one or more Schottky diodes for non-linear electrical circuitry 623a, the resistance of resistor 624a can be in the range of 4.0-6.0 megohms, or even no additional leakage may be needed.

Therefore, stylus 600 may be configured to operate as a passive or semi-passive, non-linear stylus. A semi-passive stylus may be a stylus without an active transmitter, such as a stylus that may be configured to react to the incident field but that may not be a simple linear probe like a user's finger or a conductive rod. Stylus 600 may be fabricated at a very low cost, as it may not require any internal power supply and may not require any direct coupling or communication of any wired/wireless communication interface with device 500. Stylus 600 can have an advantage over a passive stylus on a projected capacitance input device by being able to be distinguished from direct user touch events (e.g., unintentional user touch events). Non-linearity of stylus 600 may double (or otherwise provide any suitable multiple of) a modulation frequency (e.g., a fundamental frequency) of a transmitted signal TS (e.g., from 200 kHz to 400 kHz (see, e.g., FIG. 7D, from a first harmonic 771 to a second harmonic 773)) such that many cycles of non-linearity may be detected, such that noise may be reduced by requiring detection of a harmonic multiple times within multiple cycles or just once in a single cycle.

Figure 7A:
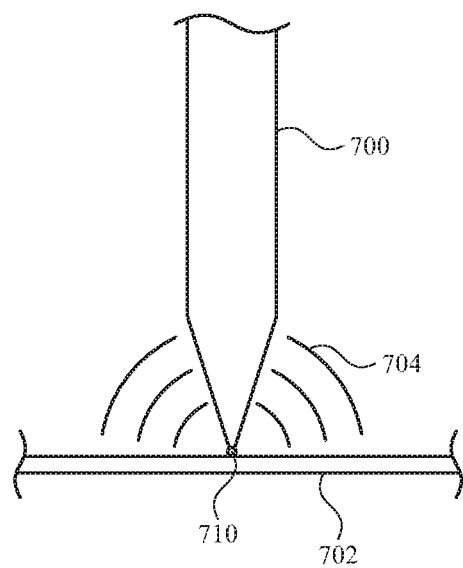
FIGS. 7A-7B illustrate the capacitive coupling of an exemplary stylus to a touch-sensitive surface according to some examples of the disclosure.
Figure 7B:
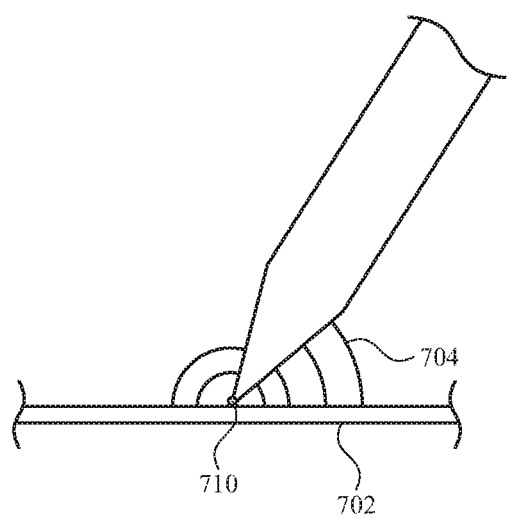

FIGS. 7A-7B illustrate the capacitive coupling 704 of an exemplary stylus 700 to a touch-sensitive surface 702 according to some examples of the disclosure. Stylus 700 can be the same as or similar to stylus 520 or stylus 600, described above with reference to FIGS. 5-6, for example. In some examples, the touch-sensitive surface 702 can be a touch screen or other touch-sensitive surface described above with reference to FIGS. 1A-5.

As described above with reference to FIG. 6, in some examples, a stylus 600 can include conductive components (e.g., the components included in front tip stylus circuitry 626a) at a location spaced away from the stylus tip 621a. In some situations, these components can capacitively couple to touch-sensitive surface 702.

Referring to FIG. 7A, while the stylus 700 is normal or substantially normal to the touch-sensitive surface 702, the capacitive coupling 704 of portions of the stylus away from the stylus tip 710 (e.g., capacitive coupling of the front tip stylus circuitry 626a) can be equal or substantially equal on all sides of the stylus 700. Thus, the centroid of the stylus 700 as detected by the touch sensitive surface 702 can be the location on the touch-sensitive surface at which the stylus tip 710 is located on the touch-sensitive surface.

Referring to FIG. 7B, while the stylus 700 is positioned at an angle relative to a position that is normal or substantially normal to the touch-sensitive surface 702, the capacitive coupling 704 of portions of the stylus away from the stylus tip 710 (e.g., capacitive coupling of the front tip stylus circuitry 626a) can be greater on a side of the stylus 700 that is closer to the touch-sensitive surface 702 than the other sides of the stylus. Thus, the centroid of the stylus 700 as detected by the touch sensitive surface 702 can be a location on the touch-sensitive surface different from the location at which the stylus tip 710 is located on the touch sensitive-surface.

Figure 7C:
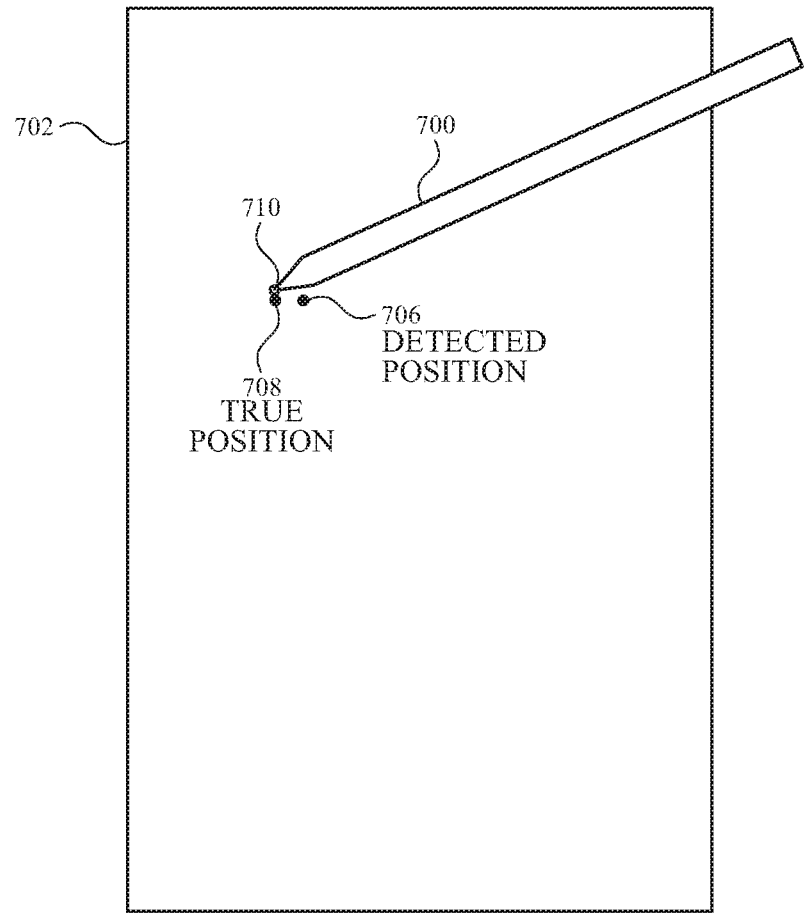
FIG. 7C illustrates an exemplary true position and an exemplary detected position of a stylus that is not normal or substantially normal to the touch-sensitive surface according to some examples of the disclosure.

FIG. 7C illustrates an exemplary true position 708 and an exemplary detected position 706 of a stylus 700 that is not normal or substantially normal to the touch-sensitive surface 702 according to some examples of the disclosure. For example, the angle of the stylus 700 in FIG. 7C can be the same as or similar to the angle of the stylus in FIG. 7B. As shown in FIG. 7C, the detected position 706 of the stylus 700 (e.g., the position detected by an electronic device in communication with touch sensitive surface 702) can be different from the true position 708 of the tip of the stylus 700. For example, the detected position 706 of the stylus 700 can be towards the portion of the stylus that is tilted towards the touch-sensitive surface 702 due to the capacitive coupling between the touch-sensitive surface 702 and one or more conductive components included in the stylus 700 (e.g., front tip stylus circuitry 626a).

Figure 8A:
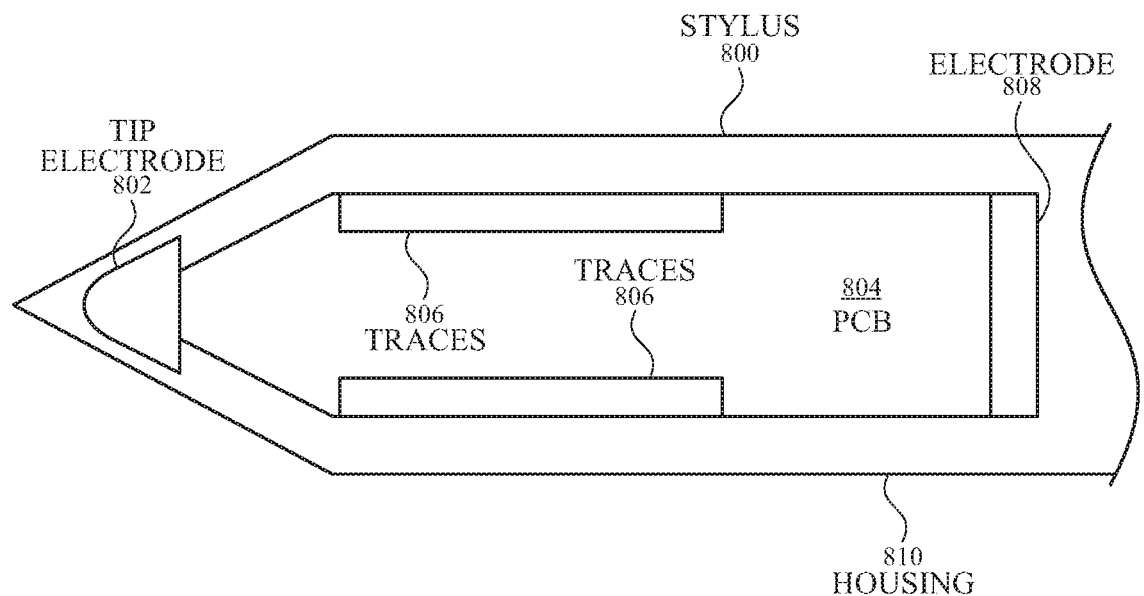
FIG. 8A illustrates an exemplary stylus that includes a printed circuit board (PCB) having shielding traces according to some examples of the disclosure.

Therefore, in some examples, it can be advantageous to prevent or reduce capacitive coupling of components of the stylus other than the stylus tip 710 to the touch-sensitive surface 702. In some examples, a stylus can include a conductive element disposed around at least some of the stylus circuitry that can prevent capacitive coupling of the circuitry to a touch-sensitive surface at which the stylus is being used to provide an input. In some examples, the closer the conductive element is placed to the tip 710 of the stylus, the more components of the circuitry the conductive element is able to shield. Thus, in some examples, placing the conductive element close to the stylus tip 710 can be advantageous because such placement can have improved shielding properties. In some examples, however, placing the conductive component too close to the stylus tip 710 can cause the stylus tip to capacitively couple to the conductive component, thereby causing a reduction in the strength of the signal being provided by the stylus tip 710. Thus, in some examples, placing the conductive element further away from the stylus tip 710 can be advantageous because such placement can improve signal strength of the stylus tip. In some examples, the tradeoff between improved shielding and improved stylus tip signal strength can be made to determine appropriate placement of the conductive element. In some examples, the conductive element can be placed 2 mm-20 mm from the tip 710 of the stylus 700. FIGS. 8A-110 illustrate examples of styluses that include conductive elements that can reduce the amount of capacitive coupling of one or more components of the stylus to the touch-sensitive surface.

FIG. 8A illustrates an exemplary stylus 800 that includes a printed circuit board (PCB) 804 having shielding traces 806 according to some examples of the disclosure. FIG. 8A illustrates a cross-section along a length of stylus 800 that includes a housing 810 in which tip electrode 802 and PCB 804 can be disposed. In some examples, the PCB 804 can include the front tip stylus circuitry 626a (not shown in FIG. 8A), an electrode 808 that can be coupled to a reference voltage, and shielding traces 806. In some examples, the electrode 808 can be coupled to the outside of the housing 810 of stylus 800. Thus, for example, the electrode 808 can be at a same electric potential as the user holding stylus 800. In some examples, if the user is coupled to earth ground or another reference voltage, the electrode 808 can be a connection to earth ground or another reference voltage. In some examples, shielding traces 806 can be coupled to electrode 808 or can be at a floating electric potential (e.g., not coupled to a reference voltage or voltage source). Shielding traces 806 can include a conductive material (e.g., a metal such as copper, silver, gold, etc.). In some examples, shielding traces 806 can capacitively couple to the front tip stylus circuitry 626a and/or other components of PCB 804 and/or to the touch sensitive surface, which can prevent the front tip stylus circuitry 626a and/or other components of PCB 804 from capacitively coupling to the touch-sensitive surface that is detecting the location of the stylus tip electrode 802.

Figure 8B:
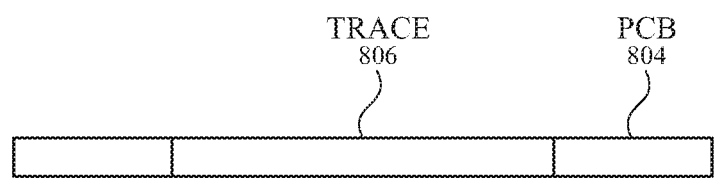
FIG. 8B illustrates an exemplary PCB including shield traces according to some examples of the disclosure.

FIG. 8B illustrates an exemplary PCB 804 including shield traces 806 according to some examples of the disclosure. PCB 804 illustrated in FIG. 8B can be the same as the PCB 804 included in FIG. 8A illustrated from a different angle (e.g., an angle in the plane of the surface of the Figures). As shown in FIG. 8B, the shielding traces 806 of the PCB can wrap from a first side of the PCB 804 (e.g., a side illustrated in FIG. 8A), around an edge of the PCB (e.g., the edge illustrated in FIG. 8B), to an opposite side of the PCB (e.g., a side opposite from the side illustrated in FIG. 8A). Although FIG. 8B illustrates one of the two shielding traces 806 illustrated in FIG. 8A, it should be understood that both of the shielding traces 806 of FIG. 8A can wrap around the edges of the PCB 804 in the manner illustrated in FIG. 8B and as described herein.

Figure 9A:
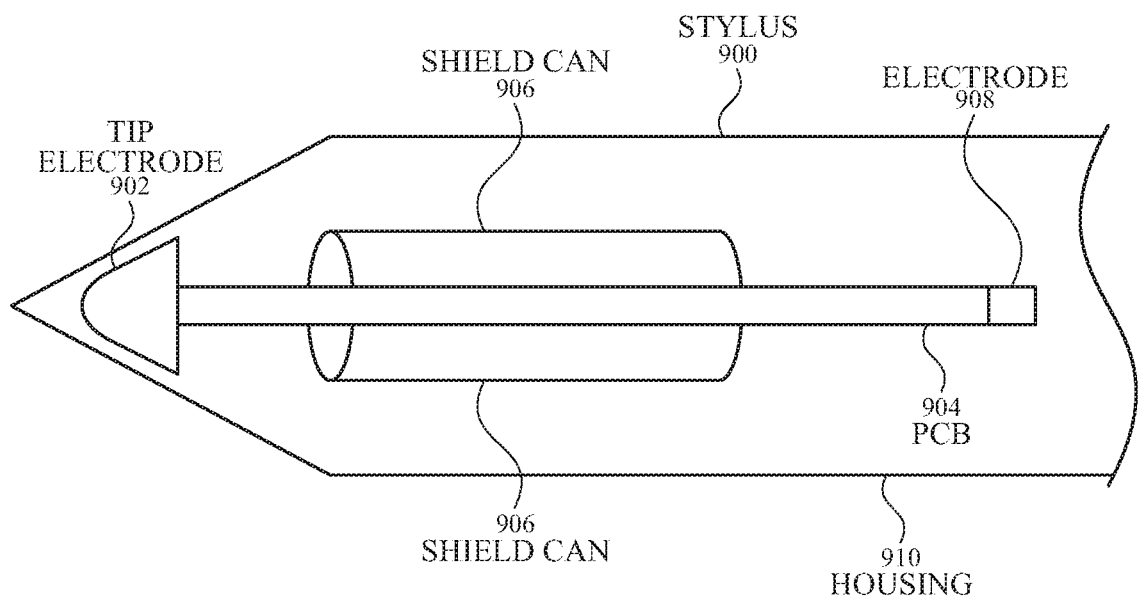
FIG. 9A illustrates an exemplary stylus that includes a PCB having a shield can according to some examples of the disclosure.

FIG. 9A illustrates an exemplary stylus 900 that includes a PCB 904 having a shield can 906 according to some examples of the disclosure. FIG. 9A illustrates a cross-section along a length of stylus 900 that includes a housing 910 in which tip electrode 902 and PCB 904 can be disposed. In some examples, the PCB 904 can include the front tip stylus circuitry 626a (not shown in FIG. 9A), an electrode 908 that can be coupled to a reference voltage, and shield can 906. In some examples, electrode 908 can be similar to electrode 808 described above with reference to FIG. 8A. In some examples, shield can 906 can be coupled to electrode 908 or can be at a floating electric potential (e.g., not coupled to a reference voltage or voltage source). Shield can 906 can include a conductive material (e.g., a metal such as copper, silver, gold, etc.). Shield can 906 can be disposed around the components of PCB 904 such that shield can 906 is disposed between the components of PCB 904 and the housing 910 of stylus 900, for example. Thus, in some examples, the shield can 906 can be positioned between the components of PCB 904 and the touch-sensitive surface while the stylus 900 is being used to provide an input to the touch-sensitive surface. In some examples, shield can 906 can capacitively couple to the front tip stylus circuitry 626a and/or other components of PCB 904 and/or to the touch sensitive surface, which can prevent the front tip stylus circuitry 626a and/or other components of PCB 904 from capacitively coupling to the touch-sensitive surface that is detecting the location of the stylus tip electrode 902.

Figure 9B:
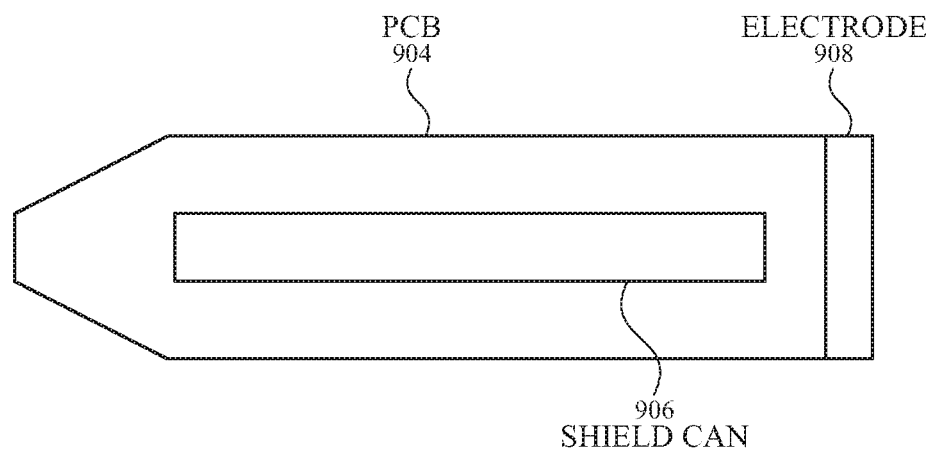
FIG. 9B illustrates an exemplary PCB including shield can according to some examples of the disclosure.

FIG. 9B illustrates an exemplary PCB 904 including shield can 906 according to some examples of the disclosure. PCB 904 illustrated in FIG. 9B can be the same as the PCB 904 included in FIG. 9A illustrated from a different angle (e.g., an angle in the plane of the surface of the Figures). As shown in FIG. 9B, the shield can 906 of the PCB 904 can cover the components of the PCB, thus providing a shield between the components of PCB and the touch-sensitive surface while the stylus 900 is being used to provide an input to a touch-sensitive surface. Although FIG. 9B illustrates one of the two shield cans 906 illustrated in FIG. 9A, it should be understood that both of the shield cans 906 of FIG. 9A can cover components of the PCB 904 in the manner illustrated in FIG. 9B and as described herein.

Figure 10:
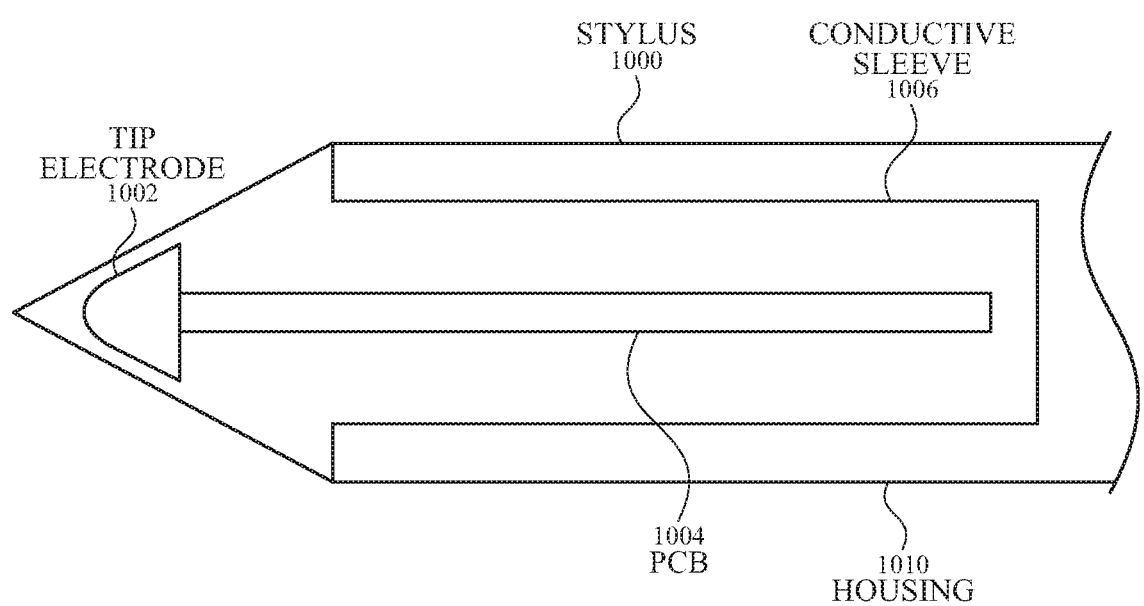
FIG. 10 illustrates an exemplary stylus that includes a conductive sleeve according to some examples of the disclosure.

FIG. 10 illustrates an exemplary stylus 1000 that includes a conductive sleeve 1006 according to some examples of the disclosure. FIG. 10 illustrates a cross-section along a length of stylus 1000 that includes a housing 1010 in which tip electrode 1002, PCB 1004, and conductive sleeve 1006 can be disposed. In some examples, the PCB 1004 can include the front tip stylus circuitry 626a (not shown in FIG. 10). Conductive sleeve 1006 can include a hollow cylindrical portion disposed around the PCB 1004 and a solid portion that can function similarly to electrode 808 and electrode 908, described above with reference to FIGS. 8A-9B, for example. In some examples, the conductive sleeve 1006 can be electrically coupled to the PCB 1004 to provide a reference voltage to PCB 1004. In some examples, conductive sleeve 1006 can be at a floating electric potential (e.g., not coupled to a reference voltage or voltage source) and/or can be electrically coupled to the user while the user holds stylus 1000 (e.g., through a conductive portion of the exterior of the housing 1010). In some examples, coupling the conductive sleeve 1006 to the user while the user holds the stylus 1000 can provide a connection to ground if the user is well-grounded.

Conductive sleeve 1006 can include a conductive material (e.g., a metal such as copper, silver, gold, etc.), for example. Conductive sleeve 1006 can be disposed around the components of PCB 1004 such that conductive sleeve 1006 is disposed between the components of PCB 1004 and the housing 1010 of stylus 1000, for example. Thus, in some examples, the conductive sleeve 1006 can be positioned between the components of PCB 1004 and the touch-sensitive surface while the stylus 1000 is being used to provide an input to the touch-sensitive surface. In some examples, the conductive sleeve 1006 can capacitively couple to the front tip stylus circuitry 626a and/or other components of PCB 1004 and/or to the touch sensitive surface, which can prevent the front tip stylus circuitry 626a and/or other components of PCB 1004 from capacitively coupling to the touch-sensitive surface that is detecting the location of the stylus tip electrode 1002.

In some examples, the conductive sleeve 1006 be formed from metal (e.g., copper, silver, gold, etc.). For example, a solid metal rod can be formed and, subsequently, a cavity can be cut into the rod into which the PCB 1004 can be disposed when the conductive sleeve 1006 and PCB 1004 are assembled in the stylus. In some examples, the stylus housing 1010 can be formed from plastic that can be injection molded around the conductive sleeve 1006. In some examples, the conductive sleeve 1006 can be formed from plastic including embedded metal particles. For example, the conductive sleeve 1006 and/or stylus housing 1010 can be injection molded from a material including metal particles and plastic. In some examples, the conductive sleeve 1006 can be integrated with the housing 1010 of the stylus 1000 in this way (e.g., the stylus housing can be formed from a conductive material instead of incorporating a separate conductive sleeve 1006).

Figure 11A:
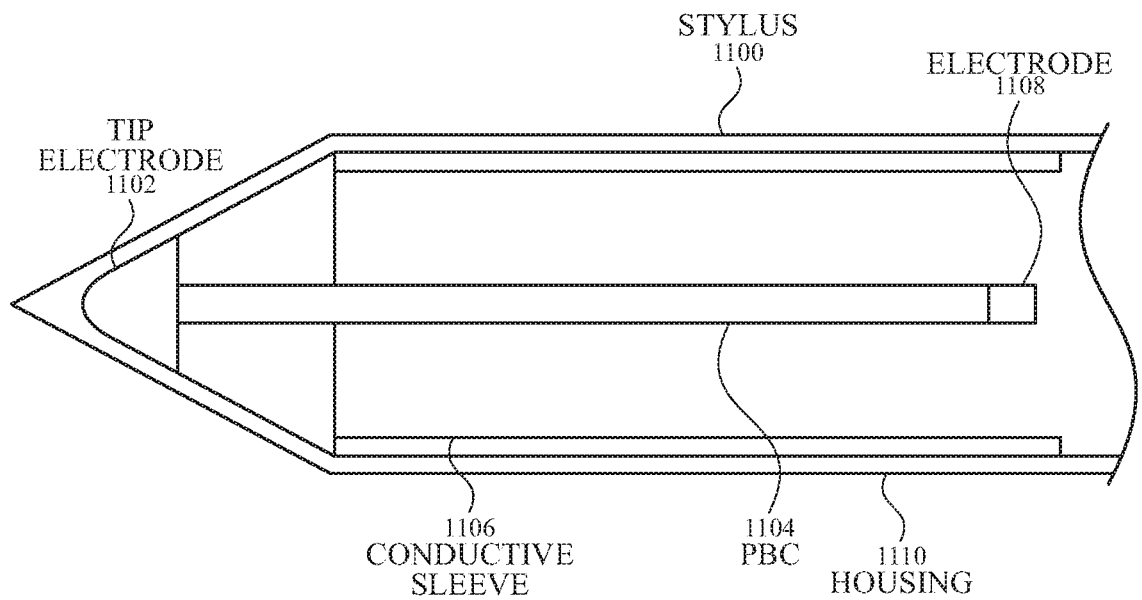
FIGS. 11A-11O illustrate an exemplary stylus that includes a conductive sleeve 1106 according to some examples of the disclosure.
Figure 11B:
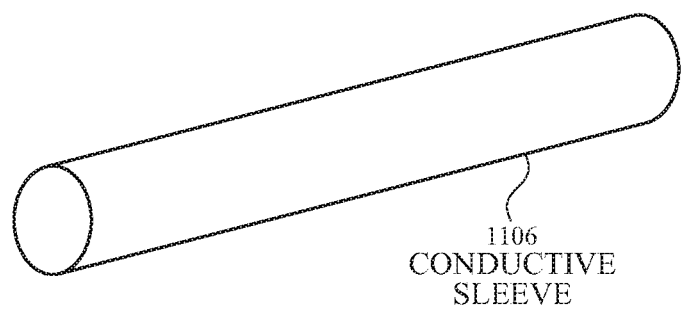
Figure 11C:
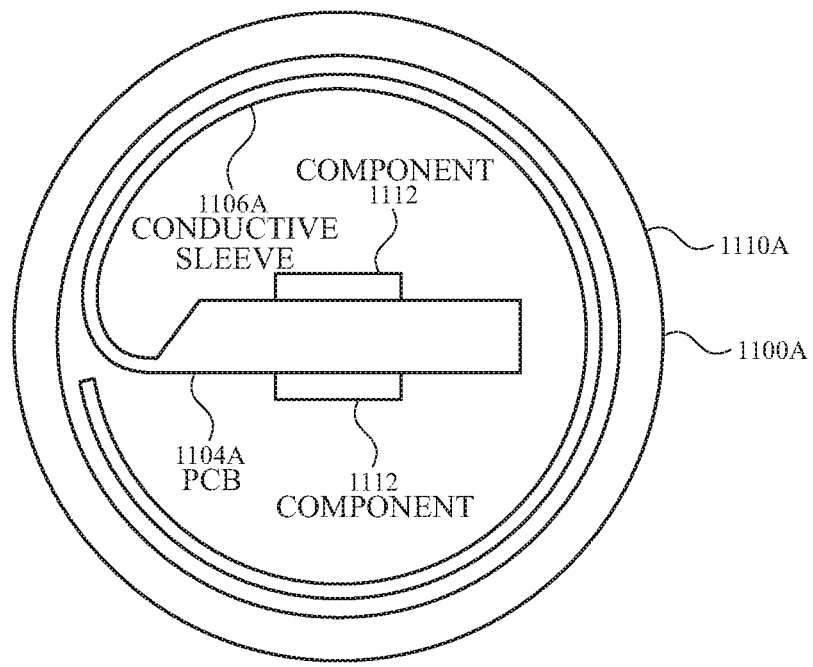
Figure 11D:
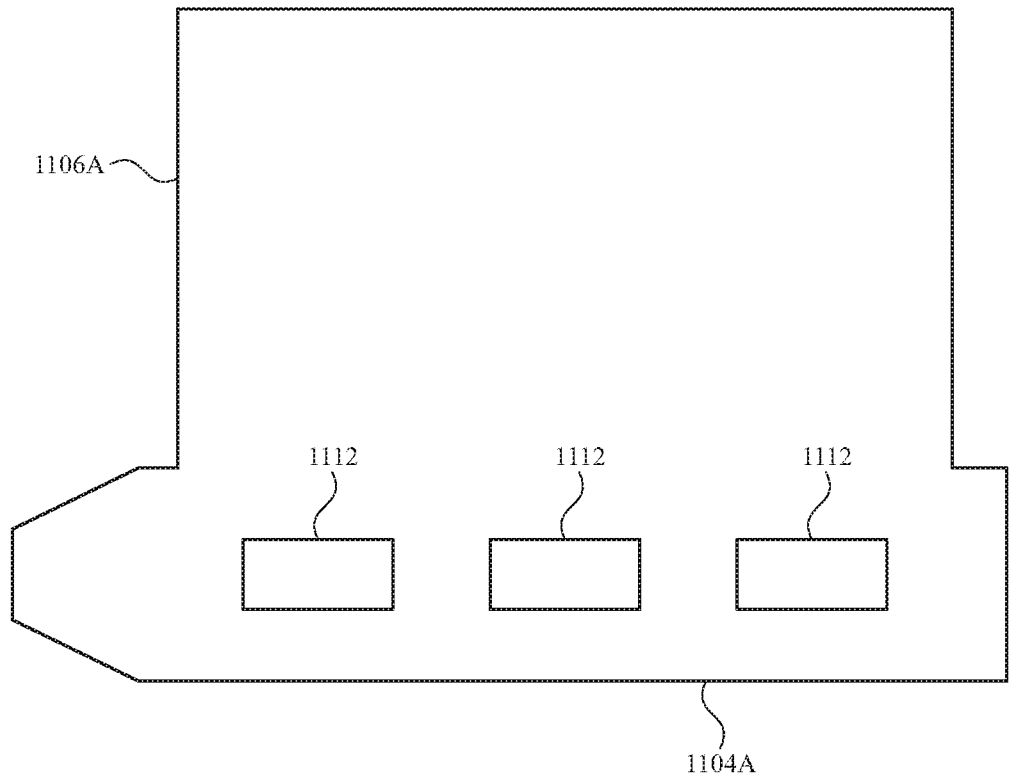
Figure 11E:
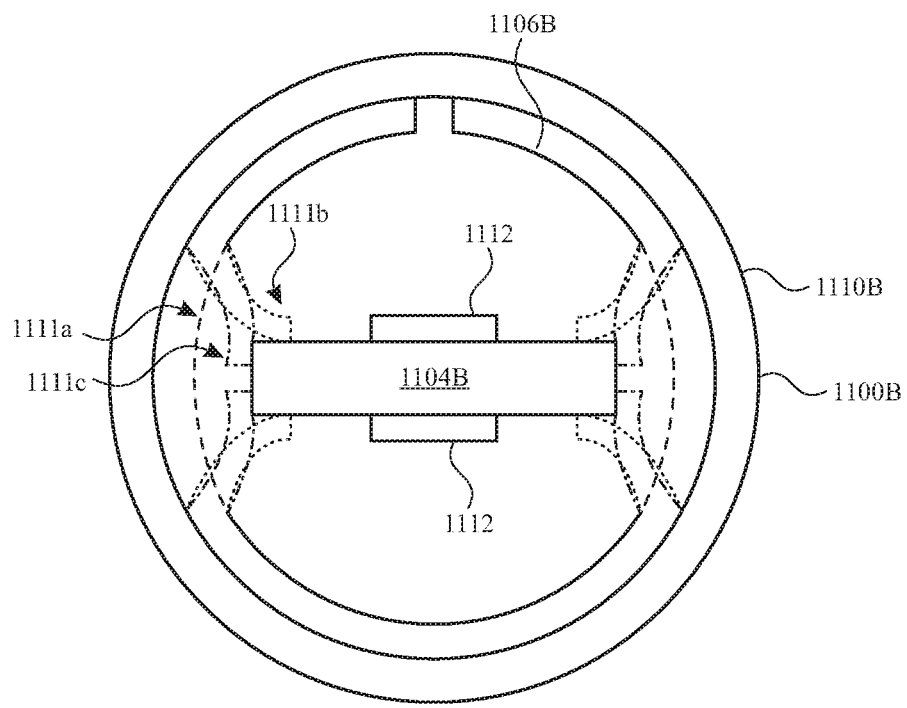
Figure 11F:
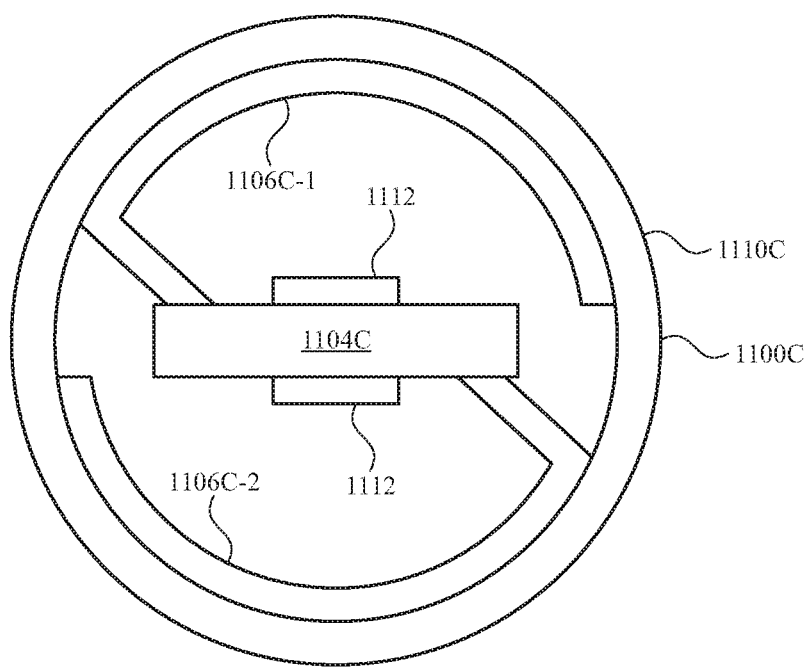
Figure 11G:
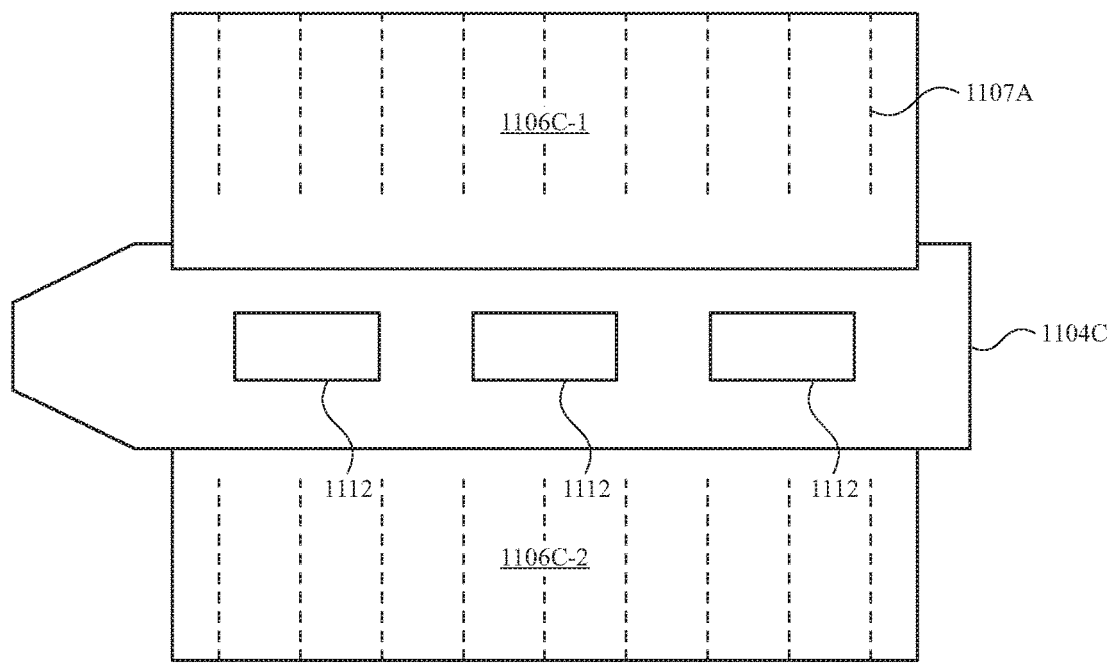
Figure 11H:
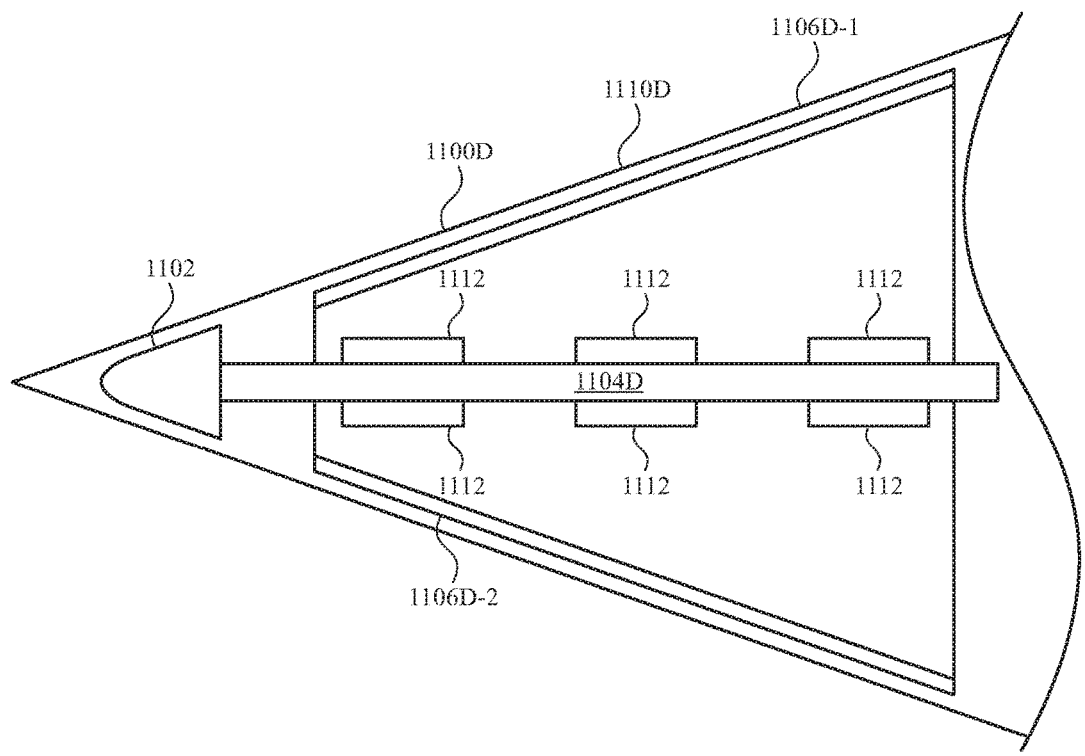
Figure 11I:
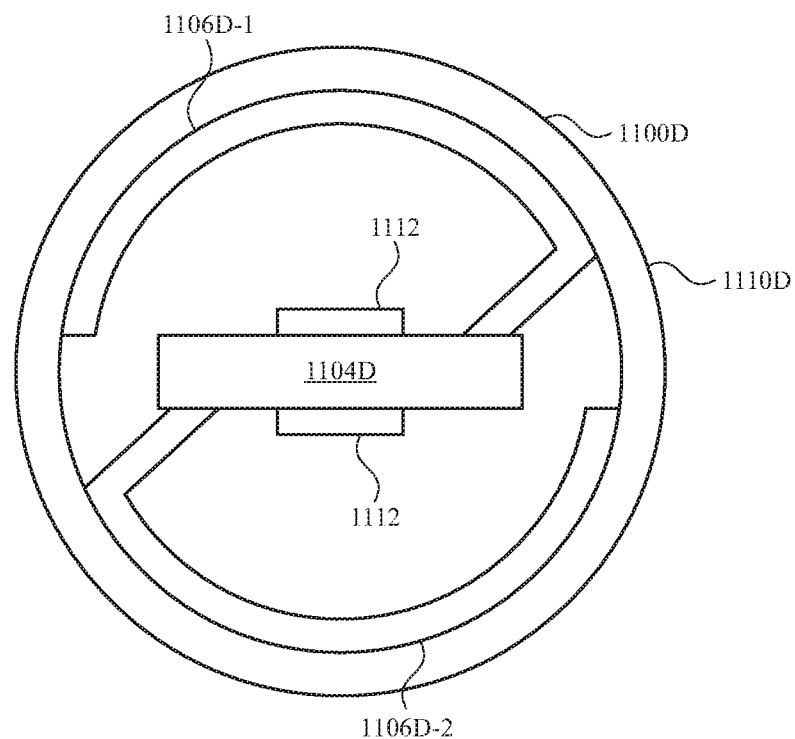
Figure 11J:
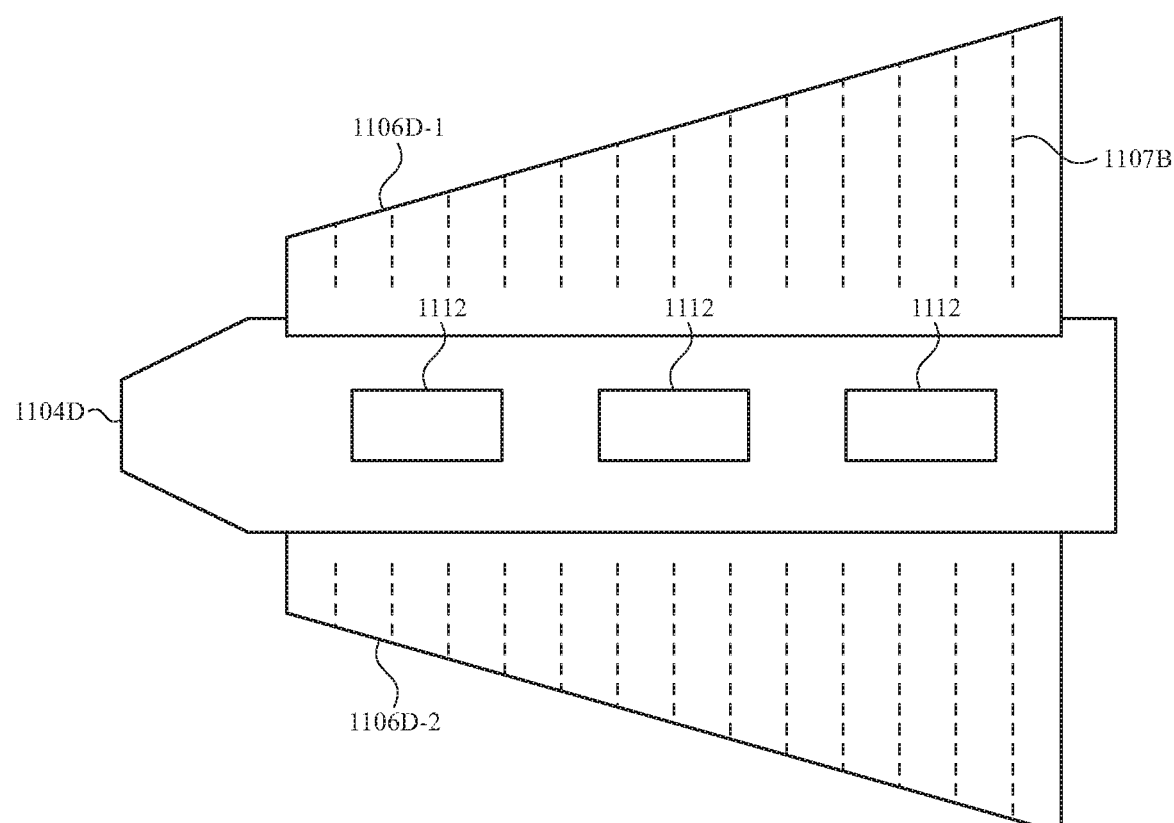
Figure 11K:
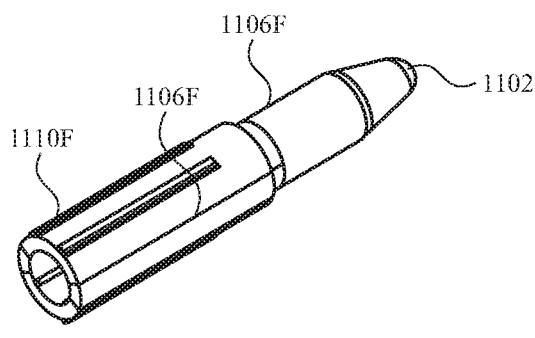
Figure 11L:
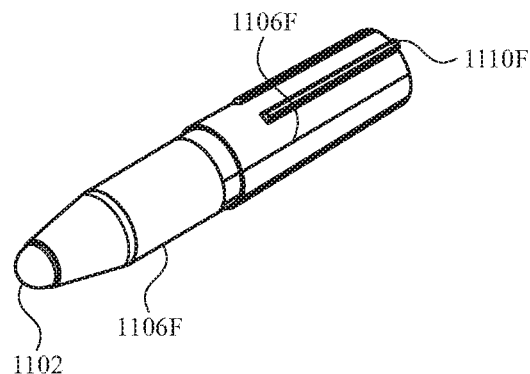
Figure 11M:
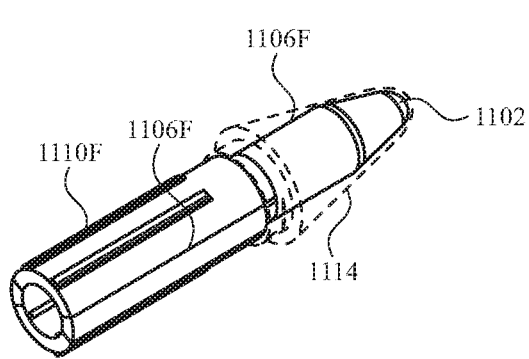
Figure 11N:
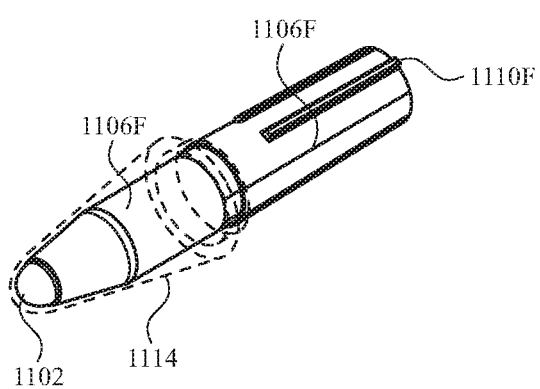
Figure 11O:
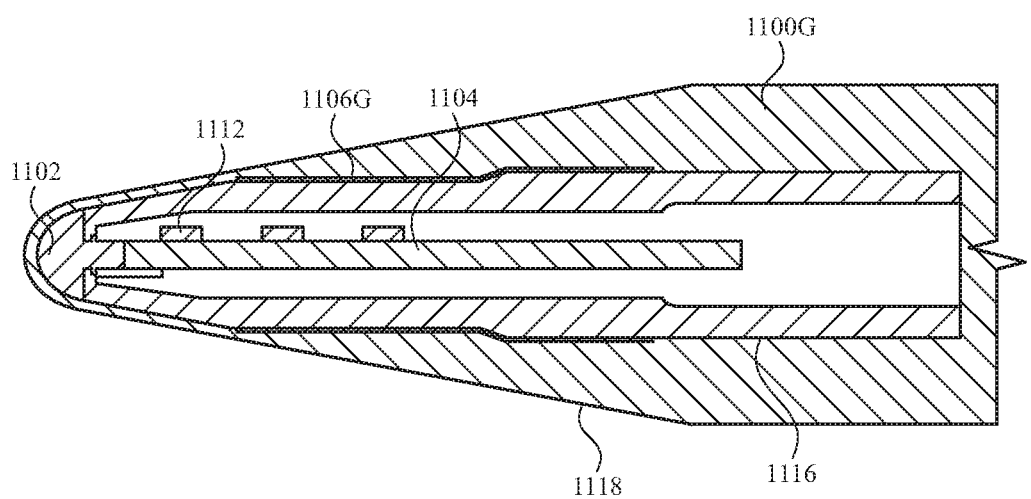

FIGS. 11A-11O illustrate an exemplary stylus 1100 that includes a conductive sleeve 1106 according to some examples of the disclosure. FIG. 11A illustrates a cross-section along a length of stylus 1100 that includes a housing 1110 in which tip electrode 1102, PCB 1104, and conductive sleeve 1106 can be disposed. In some examples, the PCB 1104 can include the front tip stylus circuitry 626a (not shown in FIG. 11) and electrode 1108 that can be coupled to a reference voltage. In some examples, electrode 1108 can be similar to electrode 808 described above with reference to FIG. 8A and/or electrode 908 described above with reference to FIGS. 9A-8B. Conductive sleeve 1106 can be disposed around the PCB 1104. In some examples, the conductive sleeve 1106 can be electrically coupled to electrode 1108. In some examples, conductive sleeve 1106 or can be at a floating electric potential (e.g., not coupled to a reference voltage, voltage source, or electrode 1108) and/or can be electrically coupled to the user while the user holds stylus 1100 (e.g., through a conductive portion of the exterior of the housing 1110). In some examples, coupling the conductive sleeve 1106 to the user while the user holds the stylus 1100 can provide a connection to ground if the user is well-grounded. Conductive sleeve 1106 can include a conductive material (e.g., a metal such as copper, silver, gold, etc.), for example. Conductive sleeve 1106 can be disposed around the components of PCB 1104 such that conductive sleeve 1106 is disposed between the components of PCB 1104 and the housing 1110 of stylus 1100, for example. In some embodiments, however, the conductive sleeve 1106 can be integrated with the housing 1110 of the stylus 1100 or can be disposed around housing 1110. Thus, in some examples, the conductive sleeve 1106 can be positioned between the components of PCB 1104 and the touch-sensitive surface while the stylus 1100 is being used to provide an input to the touch-sensitive surface. In some examples, the conductive sleeve 1106 can capacitively couple to the front tip stylus circuitry 626a and/or other components of PCB 1104 and/or to the touch sensitive surface, which can prevent the front tip stylus circuitry 626a and/or other components of PCB 1004 from capacitively coupling to the touch-sensitive surface that is detecting the location of the stylus tip electrode 1102.

FIG. 11B illustrates an exemplary conductive sleeve 1106 according to some examples of the disclosure. In some examples, conductive sleeve can be included in stylus 1100 illustrated in FIG. 11A or incorporated into one of the examples described below with reference to FIGS. 11C-11O. As shown in FIG. 11B, in some examples, the conductive sleeve 1106 can have a hollow cylinder shape. In some examples, other shapes are possible. The conductive sleeve 1106 can include a conductive material (e.g., copper, gold, silver, etc.).

In some examples, a stylus can include a conductive sleeve that is integrated with the PCB of the stylus, such as in FIGS. 11C-11D. FIG. 11C illustrates an exemplary stylus 1100A that includes a conductive sleeve 1106A that can be integrated with PCB 1104A according to some examples of the disclosure. FIG. 11C illustrates a cross-section of the stylus 1100A at a respective location along the length of the stylus 1100A that includes the PCB 1104A. Although FIG. 11C does not illustrate a stylus tip electrode 1102 or additional electrode 1108 (e.g., as shown in FIG. 11A), it should be understood that, in some examples, stylus 1100A can include these and other components.

As shown in FIG. 11C, conductive sleeve 1106A can be attached to PCB 1104A and disposed between the components 1112 of PCB 1104A and the housing 1110A of stylus 1100A, for example. In some examples, components 1112 of PCB 1104A can include the front tip stylus circuitry 626a described above with reference to FIG. 6. In some examples, the conductive sleeve 1106A can include a conductive material (e.g., copper, silver, gold). While the stylus 1100A is in use with a touch-sensitive surface, the conductive sleeve 1106A can be disposed between the PCB 1104A and the touch-sensitive surface, which can prevent capacitive coupling of the components 1112 of PCB 1104A and the touch-sensitive surface, for example. In some examples, the components 1112 of PCB 1104A and/or the touch sensitive surface can capacitively couple to the conductive sleeve 1106A instead of the components 1112 of PCB 1104A and the touch-sensitive surface capacitively coupling together. In some examples, the tension of the conductive sleeve 1106A can hold the PCB 1104A in place inside of the stylus body 1110A. In some examples, the inside of the stylus body 1110A can include brackets or other fasteners that can couple to the conductive sleeve 1106A and/or the PCB 1104A to hold the PCB 1104A in place inside the body 1110A of the stylus 1100A.

FIG. 11D illustrates an exemplary PCB 1104A including a conductive sleeve 1106A according to some examples of the disclosure. FIG. 11D illustrates the PCB 1104A while it is not disposed inside a stylus (e.g., stylus 1100A illustrated in FIG. 11C) while the conductive sleeve 1106A is unrolled. In some examples, the conductive sleeve 1106A can be coupled to one of the edges of the PCB 1104A. The PCB 1104A can include a plurality of components 1112 (e.g., including front tip stylus circuitry 626a described above with reference to FIG. 6), for example. FIG. 11D illustrates one side of the PCB 1104A. It should be understood that, in some examples, PCB 1104A can include additional components on the side opposite to the side of the PCB 1104A illustrated in FIG. 11D. In some examples, the components 1112 are disposed in a first region of the PCB 1104A (e.g., a region that remains flat while the PCB 1104A is disposed within stylus 1100A) that is different from the conductive sleeve 1106A (e.g., there are no components disposed on the surface of conductive sleeve 1106A).

FIG. 11E illustrates an exemplary stylus 1100B including a conductive sleeve 1106B with spring clips 1111a, 1111b, and/or 1111c according to some examples of the disclosure. FIG. 11E illustrates a cross-section of the stylus 1100B at a respective location along the length of the stylus 1100B that includes the PCB 1104B. Although FIG. 11E does not illustrate a stylus tip electrode 1102 or additional electrode 1108 (e.g., as shown in FIG. 11A), it should be understood that, in some examples, stylus 1100B can include these and other components.

As shown in FIG. 11E, conductive sleeve 1106B can be disposed within the housing 1110B of the stylus 1100B. In some examples, the conductive sleeve 1106B can include spring clips 1111a, 1111b, and/or 1111c that can be attached to PCB 1104B. Spring clips 1111a, 1111b, and/or 1111c can represent different possible cross-sections of conductive sleeve 1106B. For example, conductive sleeve 1106B can include spring clips 1111b or 1111c. In some examples, if conductive sleeve 1106B includes spring clips 1111a, the width of PCB 1104B can be modified to reach spring clips 1111a. In some examples, two or more profiles of spring clips 1111a, 1111b, and 1111c can be combined. In some examples, spring clips 1111a-c and the rest of conductive sleeve 1106B can be a single integrated component. For example, conductive sleeve 1106B and spring clips 1111a-c can be formed from a single piece of spring sheet metal. In some examples, spring clips 1111a-c can be a separate component that is coupled to conductive sleeve 1106B (e.g., with an adhesive, via welding, via fasteners, etc.). The spring clips 1111a-c may be conductive or non-conductive, for example.

Thus, the PCB 1104B can be held in place inside of stylus 1100B by the conductive sleeve 1106B, for example. In some examples, a spring force of conductive sleeve 1106B can hold the conductive sleeve 1106B in place inside stylus 1100B. In some examples, the conductive sleeve 1106B can be disposed between the components 1112 of PCB 1104B and the housing 1110B of stylus 1100B, for example. In some examples, components 1112 of PCB 1104B can include the front tip stylus circuitry 626a described above with reference to FIG. 6. In some examples, the conductive sleeve 1106B can include a conductive material (e.g., spring sheet metal, sheet metal, steel, copper, silver, gold). While the stylus 1100B is in use with a touch-sensitive surface, the conductive sleeve 1106B can be disposed between the PCB 1104B and the touch-sensitive surface, which can prevent capacitive coupling of the components 1112 of PCB 1104B and the touch-sensitive surface, for example. In some examples, the components 1112 of PCB 1104B and/or the touch sensitive surface can capacitively couple to the conductive sleeve 1106B instead of the components 1112 of PCB 1104B and the touch-sensitive surface capacitively coupling together.

In some examples, a stylus can include a PCB with conductive springs that act as conductive shielding components that can be disposed at a shaft of the stylus, such as in FIGS. 11F-11G. FIG. 11F illustrates an exemplary stylus 1100C that includes conductive springs 1106C-1 and 1106C-2 coupled to the PCB 1104C of the stylus 1100C according to some examples of the disclosure. FIG. 11F illustrates a cross-section of the stylus 1100C at a respective location along the length of the stylus 1100C that includes the PCB 1104C. In some examples, the PCB 1104C and the conductive springs 1106C can be disposed at a location along the shaft of the stylus 1100C at which the stylus is cylindrical (e.g., as opposed to being cone-shaped, such as towards the tip of the stylus). Although FIG. 11F does not illustrate a stylus tip electrode 1102 or additional electrode 1108 (e.g., as shown in FIG. 11A), it should be understood that, in some examples, stylus 1100C can include these and other components.

As shown in FIG. 11F, conductive springs 1106C-1 and 1106C-2 can be disposed within the housing 1110C of the stylus 1100C. In some examples, the conductive springs 1106C can be attached to PCB 1104C, as will be described in more detail below with reference to FIG. 11G. Thus, the PCB 1104C can be held in place inside of stylus 1100C by the conductive springs 1106C, for example. In some examples, the conductive springs 1106C can be disposed between the components 1112 of PCB 1104C and the housing 1110C of stylus 1100C, for example. In some examples, components 1112 of PCB 1104C can include the front tip stylus circuitry 626a described above with reference to FIG. 6. In some examples, the conductive springs 1106C can include a conductive material (e.g., copper, silver, gold). While the stylus 1100C is in use with a touch-sensitive surface, the conductive springs 1106C can be disposed between the PCB 1104C and the touch-sensitive surface, which can prevent capacitive coupling of the components 1112 of PCB 1104C and the touch-sensitive surface, for example. In some examples, the components 1112 of PCB 1104C and/or the touch sensitive surface can capacitively couple to the conductive springs 1106C instead of the components 1112 of PCB 1104C and the touch-sensitive surface capacitively coupling together.

FIG. 11G illustrates an exemplary PCB 1104C that includes conductive springs 1106C-1 and 1106C-2 according to some examples of the disclosure. FIG. 11G illustrates the PCB 1104C and conductive springs 1106C described above with reference to FIG. 11F. In FIG. 11G, the PCB 1104C and conductive springs 1106C are disposed outside of the stylus 1100C and the conductive springs are uncurled. In some examples, while the PCB 1104C and conductive springs 1106C are disposed within stylus 1100C, such as in FIG. 11F, the spring force of the conductive springs (e.g., the force attempting to uncurl the conductive springs) can hold the PCB 1104C and the conductive springs 1106C in place inside stylus 1100C. In some examples, the PCB 1104C can include two conductive springs 1106C-1 and 1106C-2 attached along opposite edges and on opposite sides of the PCB 1104C. For example, conductive spring 1106C-1 can be attached along an edge of the PCB 1104C that is along the top of the PCB in the orientation shown in FIG. 11G on the side of the PCB 1104C illustrated in FIG. 11G. Likewise, for example, conductive spring 1106C-2 can be attached along an edge of the PCB 1104C that is along the bottom of the PCB in the orientation shown in FIG. 11G on the side opposite from the side of the PCB 1104C illustrated in FIG. 11G. In some examples, the PCB 1104C can further include components 1112 (e.g., front tip stylus circuitry 626a illustrated in FIG. 6) disposed on the side of PCB 1104C illustrated in FIG. 11G and on opposite side of the PCB (not shown).

As shown in FIG. 11G, each conductive spring 1106C-1 and 1106C-2 can include optional cuts or slits 1107A in a direction extending from the PCB 1104C and away from the PCB (e.g., across the width of the conductive springs). In some examples, the cuts or slits 1107A are omitted and the conductive springs 1106C-1 and 1106C-2 can be formed from solid pieces of conductive material. In some examples, the cuts or slits 1107 can reduce the stiffness of the conductive springs 1106C, making the springs easier to roll prior to insertion into the stylus 1100C.

In some examples, a stylus can include a PCB with conductive springs that can act as conductive shield components disposed at least partially in the tip of the stylus, such as in FIGS. 11H-11J. FIG. 11H illustrates an exemplary stylus 1100D that includes conductive springs 1106D-1 and 1106D-2 coupled to the PCB 1104D of the stylus 1100D according to some examples of the disclosure. FIG. 11H illustrates a cross-section of the stylus 1100D at a respective location along the length of the stylus 1100D that includes the PCB 1104D. In some examples, the PCB 1104D and the conductive springs 1106D can be disposed at a location in the tip of the stylus at which the stylus is cone-shaped (e.g., as opposed to being cylindrical, such as along the shaft of the stylus). Although FIG. 11H does not illustrate an additional electrode 1108 (e.g., as shown in FIG. 11A), it should be understood that, in some examples, stylus 1100H can include these and other components.

FIG. 11I illustrates an exemplary stylus 1100D that includes conductive springs 1106D-1 and 1106D-2 coupled to the PCB 1104D of the stylus 1100D according to some examples of the disclosure. FIG. 11I illustrates a cross-section of the stylus 1100D at a respective location along the length of the stylus 1100D that includes the PCB 1104D. For example, the stylus 1100D illustrated in FIG. 11I is the same stylus illustrated in FIG. 11H. In some examples, the PCB 1104D and the conductive springs 1106D can be disposed at a location in the tip of the stylus 1100D at which the stylus is cone-shaped (e.g., as opposed to being cylindrical, such as along the shaft of the stylus). Although FIG. 11I does not illustrate a stylus tip electrode 1102 or additional electrode 1108 (e.g., as shown in FIG. 11A), it should be understood that, in some examples, stylus 1100D can include these and other components.

As shown in FIGS. 11H-11I, conductive springs 1106D-1 and 1106D-2 can be disposed within the housing 1110D of the stylus 1100D and follow the curve of the housing of the stylus. In some examples, the conductive springs 1106D can be attached to PCB 1104D, as shown in FIG. 11I and described in more detail below with reference to FIG. 11J. Thus, the PCB 1104D can be held in place inside of stylus 1100D by the conductive springs 1106D, for example. For example, the spring force of the conductive springs 1106D attempting to uncurl can secure the conductive springs and the PCB 1104D inside stylus 1100D. In some examples, the conductive springs 1106D can be disposed between the components 1112 of PCB 1104D and the housing 1110D of stylus 1100D, for example. In some examples, components 1112 of PCB 1104D can include the front tip stylus circuitry 626a described above with reference to FIG. 6. In some examples, the conductive springs 1106D can include a conductive material (e.g., copper, silver, gold). While the stylus 1100D is in use with a touch-sensitive surface, the conductive springs 1106D can be disposed between the PCB 1104D and the touch-sensitive surface, which can prevent capacitive coupling of the components 1112 of PCB 1104D and the touch-sensitive surface, for example. In some examples, the components 1112 of PCB 1104D and/or the touch sensitive surface can capacitively couple to the conductive springs 1106D instead of the components 1112 of PCB 1104D and the touch-sensitive surface capacitively coupling together.

FIG. 11J illustrates an exemplary PCB 1104D that includes conductive springs 1106D-1 and 1106D-2 according to some examples of the disclosure. FIG. 11J illustrates the PCB 1104D and conductive springs 1106D that can be incorporated into stylus 1100D as described above with reference to FIGS. 11H-11I. In FIG. 11J, the PCB 1104D and conductive springs 1106D are disposed outside of the stylus 1100D and the conductive springs are uncurled. In some examples, while the PCB 1104D and conductive springs 1106D are disposed within stylus 1100D, such as in FIGS. 11H-11I, the spring force of the conductive springs (e.g., the force attempting to uncurl the conductive springs) can hold the PCB 1104D and the conductive springs 1106D in place inside stylus 1100D. The conductive springs 1106D can have tapered edges: the width of the conductive springs can be narrower at one end of the PCB 1104D than the other end of the PCB, for example. In some examples, while the PCB 1104D is disposed within the stylus, such as in FIGS. 11H-11I, the narrower ends of the conductive springs can be disposed towards the stylus tip electrode 1102 and the wider ends of the conductive springs can be disposed towards the shaft of the stylus 1100D.

In some examples, the PCB 1104D can include two conductive springs 1106D-1 and 1106D-2 attached along opposite edges and on opposite sides of the PCB 1104D. For example, conductive spring 1106D-1 can be attached along an edge of the PCB 1104D that is along the top of the PCB in the orientation shown in FIG. 11J on the side of the PCB 1104D illustrated in FIG. 11J. Likewise, for example, conductive spring 1106D-2 can be attached along an edge of the PCB 1104D that is along the bottom of the PCB in the orientation shown in FIG. 11J on the side opposite from the side of the PCB 1104D illustrated in FIG. 11H. In some examples, the PCB 1104D can further include components 1112 (e.g., front tip stylus circuitry 626a illustrated in FIG. 6) disposed on the side of PCB 1104D illustrated in FIG. 11J and on opposite side of the PCB (not shown).

As shown in FIG. 11J, each conductive spring 1106D-1 and 1106D-2 can include optional cuts or slits 1107B in a direction extending from the PCB 1104D and away from the PCB (e.g., across the width of the conductive springs). In some examples, the cuts or slits 1107B are omitted and the conductive springs 1106D-1 and 1106D-2 can be formed from solid pieces of conductive material. In some examples, the cuts or slits 1107 can reduce the stiffness of the conductive springs 1106D, making the springs easier to roll prior to insertion into the stylus 1100D.

In some examples, a stylus can include a conductive shield disposed on the outside of at least a portion of the stylus housing, such as in FIGS. 11K-11N. FIGS. 11K-11L illustrate a portion of a stylus housing 1110F that includes a conductive shield 1106 disposed on the exterior of the portion of the stylus housing. In some examples, at a later stage in the manufacturing process, an additional portion of the stylus housing can be applied to the exterior of the portion of the stylus housing 1110F and the conductive shield 1106. For example, a stylus tip cover can be applied to cover the stylus tip electrode 1102, as will be described in more detail below with reference to FIGS. 11M-11N. Thus, in some examples, the stylus can include a conductive shield 1106 embedded in the stylus housing.

In some examples, the conductive shield 1106F can be formed from a conductive material, such as metal (e.g., copper, gold, silver, etc.). In some examples, the conductive material is applied as a foil. The conductive shield 1106F can include a portion that wraps all the way around the portion of the stylus housing 1110F and one or more portions that extend along the length of the portion of the stylus housing When the stylus is fully assembled, in some examples, a PCB of the stylus (e.g., including circuitry such as front tip stylus circuitry 626a) can be disposed at a location along the length of the stylus that corresponds to the location of the conductive shield 1106F. In this way, the conductive shield 1106F can be located between the stylus PCB and the touch-sensitive surface to prevent or reduce capacitive coupling between the stylus PCB and the touch-sensitive surface, as described above with reference to FIGS. 7-11J.

FIGS. 11M-11N illustrate a portion of the stylus described above with reference to FIGS. 11K-11L with stylus tip cover 1114 added to the stylus. In some examples, the stylus tip cover 1114 can be formed from plastic and can be overmolded over the portion of the stylus housing 1110F and the conductive shield 1106F. In this way, the conductive shield 1106F can be disposed between the stylus tip cover 1114 and the portion of the stylus housing 1110F. In some examples, the stylus can further include a cosmetic cover disposed over the rest of the portion of the stylus housing 1110F and the portions of the conductive shield 1106F not covered by the stylus tip cover 1114.

In some examples, a stylus can include a conductive shield disposed between portions of the stylus housing. FIG. 11O illustrates an exemplary stylus 1100G that includes a conductive shield 1106G disposed between portions 1116 and 1118 of the stylus housing according to some examples of the disclosure. Stylus 1100G can further include PCB 1104 with components 1112 (e.g., front tip stylus circuitry 626a) and stylus tip 1102, for example. The conductive shield 1106G can be disposed on the outside of a portion 1116 of the stylus housing that can hold the PCB 1104 and can connect to the stylus front tip electrode 1102. In some examples, the conductive shield can be formed from a metallic paint that can be applied to the outer surface of the portion 1116 of the stylus housing. The stylus 1100G can further include another portion 1118 of stylus housing disposed outside of the first portion 1116 of the stylus housing and the conductive shield 1106G.

In some examples, the conductive shield 1106G can be coupled to a reference electrode of the stylus 1100G (e.g., similar to electrode 1108). While the stylus 1100G is being used to provide an input via a touch-sensitive surface, the conductive shield 1106G can be between the PCB 1104 and the touch-sensitive surface to prevent or reduce capacitive coupling between the PCB 1104 and the touch-sensitive surface.

Some examples of the disclosure are directed to an input device comprising: a housing oriented along an axis; a printed circuit board (PCB) including circuitry, the circuitry disposed within a first distance of the axis; an electrode coupled to the circuitry; and a conductive element disposed around at least a portion of the circuitry. Additionally or alternatively, in some examples, the conductive element includes a conductive sleeve coupled to a side of the PCB that is parallel to the axis. Additionally or alternatively, in some examples, the conductive element includes a hollow cylinder in which at least the portion of the circuitry is disposed, the conductive element further comprising a plurality of spring clips mechanically coupled to the PCB. Additionally or alternatively, in some examples, the housing includes: a first portion disposed a third distance from the axis, the third distance between the first distance and the second distance, and a second portion disposed a fourth distance from the axis, the fourth distance greater than the third distance, and the conductive element is disposed between the first and second portions of the housing. Additionally or alternatively, in some examples, the conductive element is integrated with the housing. Additionally or alternatively, in some examples, the circuitry includes a second portion located along the axis between the electrode and the conductive element.

Some examples of the disclosure are directed to an input device comprising a housing oriented along an axis; a printed circuit board (PCB) including circuitry, the circuitry disposed within a first distance of the axis; an electrode coupled to the circuitry; and a conductive element disposed at a same location along the axis at which at least a portion of the circuitry is disposed, the conductive element being disposed a second distance from the axis that is greater than the first distance. Additionally or alternatively, in some examples, the conductive element includes a conductive trace disposed at the edge of the PCB. Additionally or alternatively, in some examples, the conductive element includes a shield can coupled to the PCB. Additionally or alternatively, in some examples, the conductive element includes: a hollow cylindrical portion in which the PCB is disposed, and a solid portion disposed at a location along the axis different from the same location along the axis at which at least the portion of the circuitry is disposed. Additionally or alternatively, in some examples, the conductive element includes a conductive sleeve coupled to a side of the PCB that is parallel to the axis. Additionally or alternatively, in some examples, the conductive element includes a hollow cylinder in which at least the portion of the circuitry is disposed, the conductive element further comprising a plurality of spring clips mechanically coupled to the PCB. Additionally or alternatively, in some examples, the housing includes: a first portion disposed a third distance from the axis, the third distance between the first distance and the second distance, and a second portion disposed a fourth distance from the axis, the fourth distance greater than the third distance, and the conductive element is disposed between the first and second portions of the housing. Additionally or alternatively, in some examples, the conductive element is integrated with the housing. Additionally or alternatively, in some examples, the circuitry includes a second portion located along the axis between the electrode and the conductive element.

Some examples of the disclosure are directed to an input device, comprising: a housing oriented along an axis; a printed circuit board (PCB) including circuitry; an electrode coupled to the circuitry; and a conductive sleeve coupled to a side of the PCB and disposed around at least a portion of the circuitry. Additionally or alternatively, in some examples, the conductive sleeve includes a plurality of slits perpendicular to the axis. Additionally or alternatively, in some examples, the conductive sleeve is parallel to the axis. Additionally or alternatively, in some examples, the conductive sleeve is not parallel to the axis.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An input device comprising:
    a housing oriented along an axis;

a printed circuit board (PCB) including circuitry, the circuitry disposed within a first distance of the axis and the circuitry including a first portion and a second portion;

a tip electrode coupled to the circuitry, the first portion of the circuitry closer to the tip electrode than the second portion of the circuitry; and a conductive element disposed around at least a portion of the circuitry, wherein the conductive element is disposed around the second portion of the circuitry but not around the first portion of the circuitry, wherein the conductive element is disposed within a second distance from the axis that is greater than the first distance, and wherein the circuitry is located along the axis between the tip electrode and the conductive element.

2. The input device of claim 1, wherein the conductive element includes a conductive sleeve coupled to a side of the PCB that is parallel to the axis.

3. The input device of claim 1, wherein the conductive element includes a hollow cylinder in which at least the portion of the circuitry is disposed, the conductive element further comprising a plurality of spring clips mechanically coupled to the PCB.

4. The input device of claim 1, wherein:
the housing includes:
a first portion disposed a third distance from the axis, the third distance between the first distance and the second distance, and
a second portion disposed a fourth distance from the axis, the fourth distance greater than the third distance, and
the conductive element is disposed between the first and second portions of the housing.

5. The input device of claim 1, wherein the conductive element is integrated with the housing.

6. An input device comprising:
a housing oriented along an axis;
a printed circuit board (PCB) including circuitry, the circuitry disposed within a first distance of the axis and the circuitry including a first portion and a second portion;
a tip electrode coupled to the circuitry, the first portion of the circuitry closer to the tip electrode than the second portion of the circuitry; and
a conductive element disposed at a same location along the axis at which at least a portion of the circuitry is disposed, the conductive element being disposed a second distance from the axis that is greater than the first distance, the conductive element being disposed around the second portion of the circuitry but not around the first portion of the circuitry, and wherein the circuitry is located along the axis between the tip electrode and the conductive element.

7. The input device of claim 6, wherein the conductive element includes a conductive trace disposed at the edge of the PCB.

8. The input device of claim 6, wherein the conductive element includes a shield can coupled to the PCB.

9. The input device of claim 6, wherein the conductive element includes:
a hollow cylindrical portion in which the PCB is disposed, and
a solid portion disposed at a location along the axis different from the same location along the axis at which at least the portion of the circuitry is disposed.

10. The input device of claim 6, wherein the conductive element includes a conductive sleeve coupled to a side of the PCB that is parallel to the axis.

11. The input device of claim 6, wherein the conductive element includes a hollow cylinder in which at least the portion of the circuitry is disposed, the conductive element further comprising a plurality of spring clips mechanically coupled to the PCB.

12. The input device of claim 6, wherein:
the housing includes:
a first portion disposed a third distance from the axis, the third distance between the first distance and the second distance, and
a second portion disposed a fourth distance from the axis, the fourth distance greater than the third distance, and
the conductive element is disposed between the first and second portions of the housing.

13. The input device of claim 6, wherein the conductive element is integrated with the housing.

14. An input device, comprising:
a housing oriented along an axis;
a printed circuit board (PCB) including circuitry, the circuitry disposed within a first distance of the axis and the circuitry including a first portion and a second portion;
a tip electrode coupled to the circuitry, the first portion of the circuitry closer to the tip electrode than the second portion of the circuitry; and
a conductive sleeve coupled to a side of the PCB and disposed around at least a portion of the circuitry, wherein the conductive sleeve is disposed around the second portion of the circuitry but not around the first portion of the circuitry, wherein the conductive sleeve is disposed within a second distance from the axis that is greater than the first distance, and wherein the circuitry is located along the axis between the tip electrode and the conductive sleeve.

15. The input device of claim 14, the conductive sleeve includes a plurality of slits perpendicular to the axis.

16. The input device of claim 14, wherein the conductive sleeve is parallel to the axis.

17. The input device of claim 14, wherein the conductive sleeve is not parallel to the axis.

* * * * *